(12) United States Patent
Ikeda

(10) Patent No.: US 7,692,890 B2
(45) Date of Patent: Apr. 6, 2010

(54) FLYING HEIGHT CONTROL METHOD AND CIRCUIT

(75) Inventor: Toru Ikeda, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/353,088

(22) Filed: Jan. 13, 2009

(65) Prior Publication Data

US 2009/0296262 A1    Dec. 3, 2009

(30) Foreign Application Priority Data

May 29, 2008    (JP)    ............... 2008-141651

(51) Int. Cl.
GIIB 5/60    (2006.01)

(52) U.S. Cl. ...................................... 360/75

(58) Field of Classification Search .............. None
See application file for complete search history.

(56) References Cited

U.S. PATENT DOCUMENTS

| 5,831,781 | A * | 11/1998 | Okamura ................ 360/75 |
| 6,097,559 | A * | 8/2000 | Ottesen et al. ............. 360/31 |
| 6,747,824 | B1 * | 6/2004 | Smith ...................... 360/75 |
| 6,771,454 | B2 * | 8/2004 | White et al. ............. 360/77.03 |
| 7,245,452 | B1 | 7/2007 | Riener et al. |
| 7,271,974 | B2 * | 9/2007 | Fukuyama et al. ........... 360/75 |
| 7,511,914 | B2 * | 3/2009 | Hiller et al. ................ 360/75 |
| 7,586,711 | B2 * | 9/2009 | Knigge et al. .............. 360/75 |
| 2003/0193727 | A1 * | 10/2003 | Fioravanti et al. ......... 360/75 |
| 2009/0027800 | A1 * | 1/2009 | Iwamoto et al. ............ 360/75 |
| 2009/0052080 | A1 * | 2/2009 | Eaton et al. ............... 360/75 |
| 2009/0052091 | A1 * | 2/2009 | Eaton et al. ............. 360/254.8 |

FOREIGN PATENT DOCUMENTS

| JP | A 5-20635 | 1/1993 |
| JP | A 10-334626 | 12/1998 |

* cited by examiner

*Primary Examiner*—William J Klimowicz
*Assistant Examiner*—James L Habermehl
(74) *Attorney, Agent, or Firm*—Greer, Burns & Crain, Ltd.

(57) ABSTRACT

A method of the present invention is used to control a flying height of a head operable to read data from and write data to a disk of a recording medium housed in an enclosure. In this method, the head is positioned to a predetermined radial measurement location on the disk to obtain error information on errors in the positioning of the head. A frequency analysis is performed on the obtained error information. Disturbance information on errors caused by a wind disturbance is calculated from the frequency analysis result. Pressure information on an air pressure in the enclosure is calculated based on the calculated disturbance information. A control value for controlling a flying height of the head with respect to the disk is determined based on the calculated pressure information. The flying height of the head is controlled based on the determined control value.

17 Claims, 21 Drawing Sheets

FIG. 9A

| SERVO FRAME | 1 | 2 | ... | 199 | 200 |
|---|---|---|---|---|---|
| 1ST ROTATION | 1-1 | 1-2 | ... | 1-199 | 1-200 |
| 2ND ROTATION | 2-1 | 2-2 | ... | 2-199 | 2-200 |
| ⋮ | | | | | |
| 3RD ROTATION | 99-1 | 99-2 | ... | 99-199 | 99-200 |
| 100TH ROTATION | 100-1 | 100-2 | ... | 100-199 | 100-200 |

FIG. 9B

| AVERAGE OF 1-1- 100-1 | AVERAGE OF 1-2- 100-2 | ... | AVERAGE OF 1-199- 100-199 | AVERAGE OF 1-200- 100-200 |
|---|---|---|---|---|
| RPE1 | RPE2 | ... | RPE199 | RPE200 |

FIG. 9C

| SERVO FRAME | 1 | 2 | ... | 199 | 200 |
|---|---|---|---|---|---|
| 1ST ROTATION | (1-1)-RPE1 =$NRPE_{1-1}$ | (1-2)-RPE2 =$NRPE_{1-2}$ | ... | (1-199)-RPE199 =$NRPE_{1-199}$ | (1-200)-RPE200 =$NRPE_{1-200}$ |
| 2ND ROTATION | (2-1)-RPE1 =$NRPE_{2-1}$ | (2-2)-RPE2 =$NRPE_{2-2}$ | ... | (2-199)-RPE199 =$NRPE_{2-199}$ | (2-200)-RPE200 =$NRPE_{2-200}$ |
| ⋮ | | | | | |
| 3RD ROTATION | (99-1)-RPE1 =$NRPE_{99-1}$ | (99-2)-RPE2 =$NRPE_{99-2}$ | ... | (99-199)-RPE199 =$NRPE_{99-199}$ | (99-200)-RPE200 =$NRPE_{99-200}$ |
| 100TH ROTATION | (100-1)-RPE1 =$NRPE_{100-1}$ | (100-2)-RPE2 =$NRPE_{100-2}$ | ... | (100-199)-RPE199 =$NRPE_{100-199}$ | (100-200)-RPE200 =$NRPE_{100-200}$ |

FIG. 14

| HEAD NO | HEATER CONTROL VALUE | |
| --- | --- | --- |
| | BASE CONTROL VALUE | ADJUSTMENT CONTROL VALUE |
| 16A | B1 | R1 |
| 16B | B2 | R2 |
| 16C | B3 | R3 |
| 16D | B4 | R4 |

FLYING HEIGHT CONTROL METHOD AND CIRCUIT

CROSS-REFERENCE TO RELATED APPLICATION

This application is based upon and claims the benefit of priority of the prior Japanese Patent Application No. 2008-141651, filed on May 29, 2008, the entire contents of which are incorporated herein by reference.

FIELD

The present invention relates to a flying height control method, a flying height control circuit, and an information storage device, and more particularly to a method and a circuit of determining a control value for a flying height between a recording medium and a head, and an information storage device having such a circuit.

BACKGROUND

In a magnetic disk device, a slider having a magnetic head flies at a location that is extremely close to a surface of the disk by using an airflow produced by rotation of a disk. By reducing the flying height of the magnetic head, it is possible to increase the sensibility of the magnetic head and prevent unnecessary spread of a magnetic field. Therefore, reduction in flying height of a magnetic head has been required to increase the capacity of a magnetic disk device.

Recently, the flying height of magnetic heads has been reduced by improvement in design of flying surfaces and by improvement in technology of processing sliders. Furthermore, a method of actively controlling the flying height has been proposed. For example, a resistor for heating is provided in a head and is supplied with a current to generate heat. The generated heat deforms the head so that a portion of the head protrudes toward a surface of a disk to thereby reduce the flying height. See Japanese laid-open patent publication No. 5-20635.

Meanwhile, recent concern has been raised that a space (flying height) between a head and a magnetic disk varies depending upon an air pressure. If the space is narrowed by variation of the air pressure, then the head may be brought into contact with the magnetic disk to produce dust (or contamination) or to cause wear of the head.

Accordingly, a conventional device has been required to have a wide space formed between a head and a magnetic disk in expectation of variations of the flying height due to an air pressure. Variations of the flying height due to an air pressure greatly differ from one head to another. Accordingly, read/write characteristics may be deteriorated in a case where a sufficient space is ensured between a head and a magnetic disk.

In this regard, the flying height may be controlled actively depending upon variations of an air pressure as disclosed in Japanese Laid-open Patent Publication No. 5-20635. However, a conventional magnetic disk device does not include a detector for detecting variations of an air pressure. Accordingly, the conventional magnetic disk device cannot employ such a proposed method. Furthermore, an air pressure sensor capable of detecting variations of an air pressure is considerably expensive. Therefore, if such an air pressure sensor is provided in a magnetic disk device, the cost of the magnetic disk device may problematically be increased. As disclosed in Japanese Laid-open Patent Publication No. 10-334626, a method of converting a servo current value into an air pressure may be employed to resolve the above problems. However, an air pressure has been desired to be measured more accurately for control of the flying height of magnetic heads.

SUMMARY

According to a first aspect of the present invention, there is provided a method of controlling a flying height of a head operable to read data from and write data to a disk of a recording medium housed in an enclosure, the method including: positioning the head to a predetermined radial measurement location on the disk; obtaining error information on errors in the positioning of the head; performing a frequency analysis on the obtained error information; calculating disturbance information on errors caused by a wind disturbance from the frequency analysis result; calculating pressure information on an air pressure in the enclosure based on the calculated disturbance information; determining a control value for controlling a flying height of the head with respect to the disk based on the calculated pressure information; and controlling the flying height of the head based on the determined control value.

BRIEF DESCRIPTION OF THE DRAWINGS

FIGS. 9A to 9C are diagrams explanatory of a method of processing positioning error data;

FIG. 14 is a table showing heads and heater control values corresponding to the heads;

DESCRIPTION OF EMBODIMENTS

The inventor has examined some methods of measuring variations of an air pressure in an enclosure of a magnetic disk device indirectly from other phenomena in the magnetic disk device. Consequently, the inventors have found that variations of an air pressure greatly affect error information (data) on errors in positioning of a head. The inventors have also found that one of factors to cause variations of an air pressure is variations of wind disturbances. The inventors have confirmed that only a limited range of errors in positioning is greatly affected by a wind disturbance. The present invention has the following aspects based upon such new findings.

First Embodiment

An information storage device according to a first embodiment of the present invention will be described in detail with reference to FIGS. 1 to 17.

Figure 1:
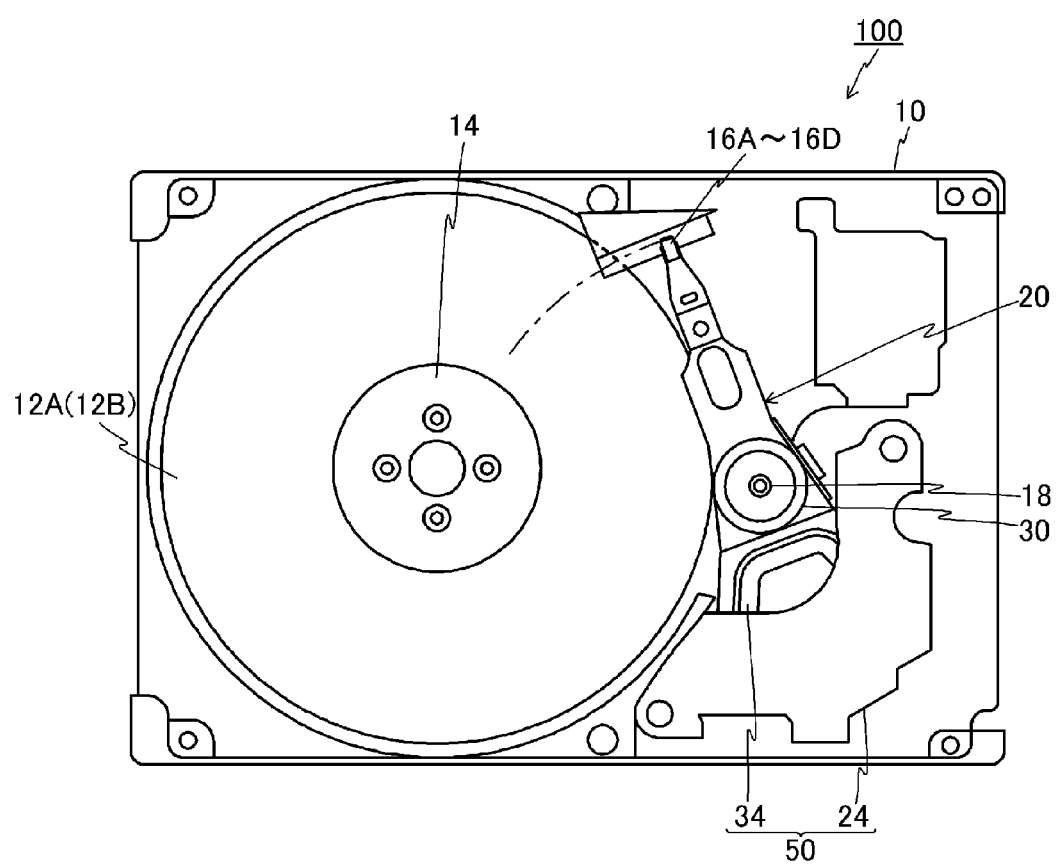
FIG. 1 is a plan view showing an internal structure of a hard disk drive (HDD) according to a first embodiment of the present invention.

FIG. 1 shows an internal structure of a hard disk drive (HDD) 100 as an information storage device according to a first embodiment of the present invention. As depicted in FIG. 1, the HDD 100 includes a box-shaped enclosure 10, magnetic disks 12A and 12B as recording media housed in a space (receptacle space) inside of the enclosure 10, a spindle motor 14, and a head stack assembly (HSA) 20. The magnetic disk 12B is not illustrated in FIG. 1 because it is located behind the magnetic disk 12A. Although the enclosure 10 is practically formed by a base and a top cover, FIG. 1 only shows the base for the purpose of illustration.

Figure 3:
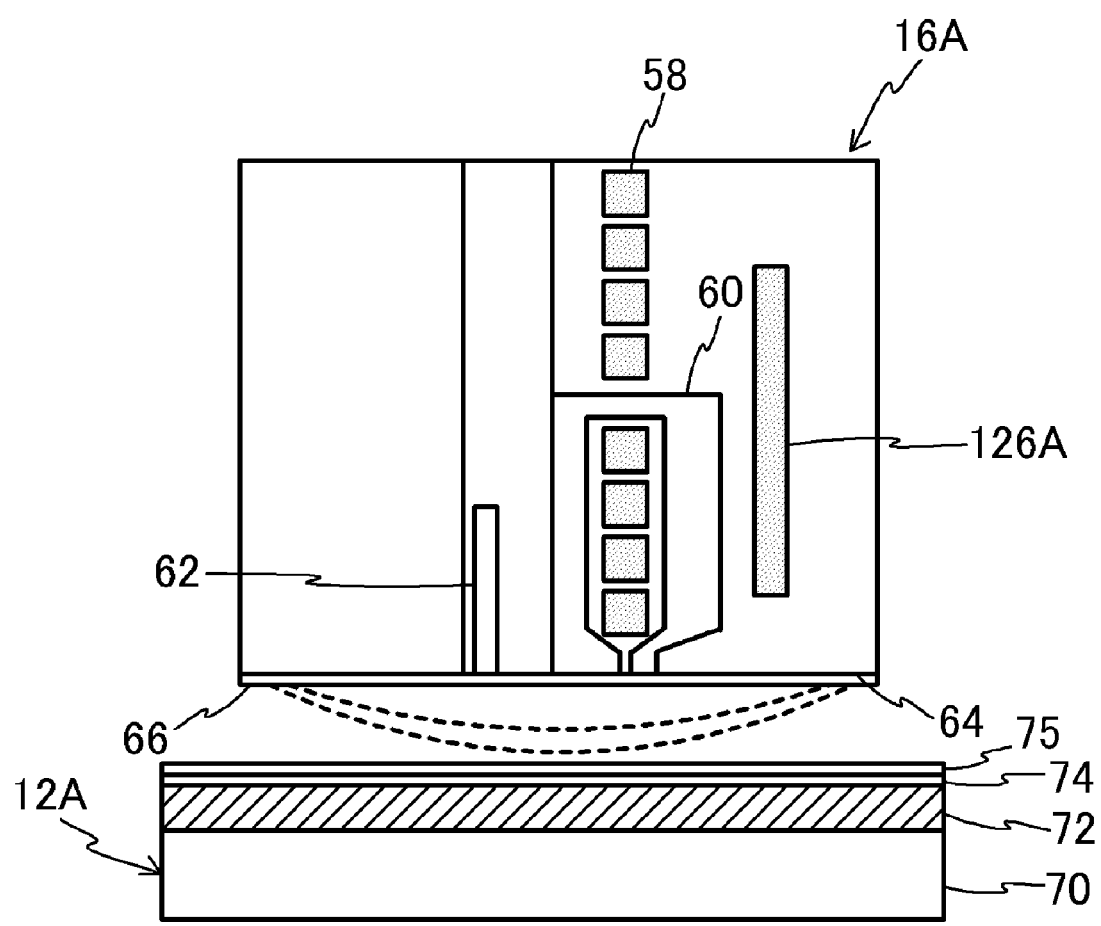
FIG. 3 is a view showing an arrangement of a head and a magnetic disk in the HDD depicted in FIG. 1.

Each of the magnetic disks 12A and 12B has front and rear faces serving as recording surfaces. These magnetic disks 12A and 12B are rotated together about the rotation axis at a high speed of, for example, 4,200 rpm to 15,000 rpm by the spindle motor 14. As depicted in FIG. 3, the magnetic disk 12A includes a substrate 70, a recording film 72 formed on an upper surface of the substrate 70, a protective film 74 formed on the recording film 72, and a lubricant 75. Although not illustrated in FIG. 3, the magnetic disk 12A also includes a recording film, a protective film, and a lubricant on a lower surface of the substrate 70. The magnetic disk 12B has the same structure as the magnetic disk 12A.

Figure 2A:
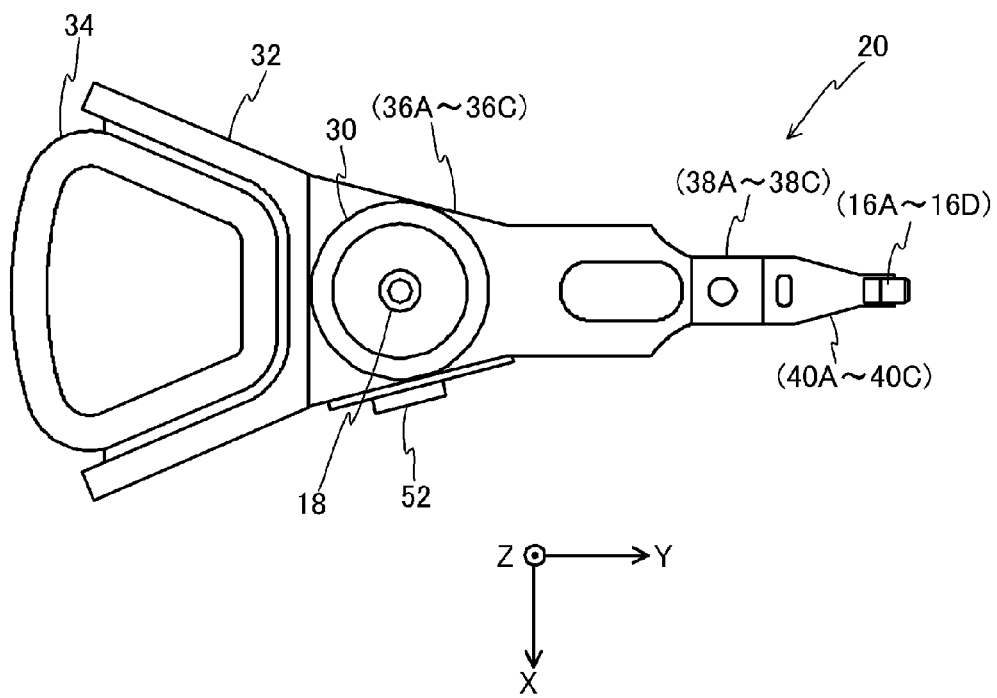
FIGS. 2A and 2B are views showing a structure of a head stack assembly (HAS) in the HDD depicted in FIG. 1.
Figure 2B:
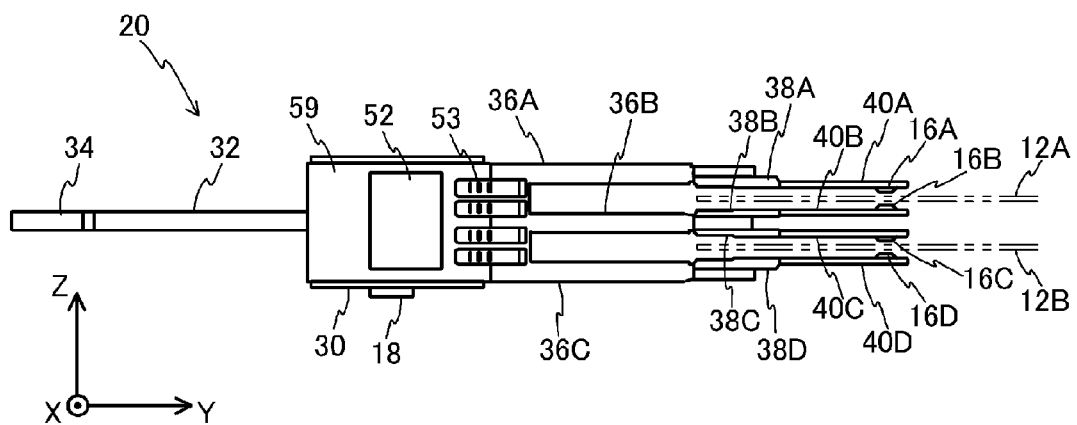

FIG. 2A is a plan view showing the HSA 20. In the following description, a transverse direction of the HSA 20 is defined as an X-axis direction, whereas a longitudinal direction of the HSA 20 is defined as a Y-axis direction. A direction perpendicular to both of the X-axis direction and the Y-axis direction is defined as a Z-axis direction. FIG. 2B shows the HSA 20 as viewed in the negative direction of the X-axis.

As depicted in FIGS. 2A and 2B, the HSA 20 includes a cylindrical housing portion 30, a fork portion 32 fixed to an end of the housing portion 30 in the negative direction of the Y-axis, a coil 34 supported in the fork portion 32, three carriage arms 36A, 36B, and 36C fixed to the housing portion 30 at predetermined intervals in the height direction (the Z-axis direction) of the HSA 20, four heads 16A, 16B, 16C, and 16D supported by the three carriage arms 36A-36C, and a head IC 52 provided on a sidewall of the housing portion 30. The head IC 52 serves as a flying height adjustment unit operable to adjust the flying height of the heads 16A-16D with respect to the corresponding disk 12A and 12B. A bearing member 18 is provided at a central portion of the housing portion 30. The HSA 20 is coupled to the enclosure 10 by the bearing member 18 so as to be rotatable about the Z-axis. Furthermore, as depicted in FIG. 1, a magnetic pole unit 24 including a permanent magnet is fixed to the enclosure 10. The coil 34 of the HSA 20 and the magnetic pole unit 24 form a voice coil motor (VCM) 50. The HSA 20 is operable to swing about the bearing member 18 by the voice coil motor 50. In FIG. 1, the swinging movement is indicated by a chain line.

For example, the carriage arms 36A-36C are formed by punching stainless plates or extruding aluminum material.

As depicted in FIG. 2B, a head suspension 40A is attached to the carriage arm 36A via a base plate 38A. The head 16a is mounted on a lower surface at an end of the head suspension 40A in the positive direction of the Y-axis. A head suspension 40B is attached to the carriage arm 36B via a base plate 38B. The head 16B is mounted on an upper surface at an end of the head suspension 40B in the positive direction of the Y-axis. A head suspension 40C is attached to the carriage arm 36B via a base plate 38C. The head 16C is mounted on a lower surface at an end of the head suspension 40C in the positive direction of the Y-axis. A head suspension 40D is attached to the carriage arm 36C via a base plate 38D. The head 16D is mounted on an upper surface at an end of the head suspension 40D in the positive direction of the Y-axis. Practically, these heads 16A-16D are mounted to the head suspensions 40A to 40D, respectively, in a state in which they are held by head sliders (not depicted). As depicted in FIG. 2B, the heads 16A and 16B are vertically opposed (in the Z-axis direction) so as to interpose the magnetic disk 12A there between. The heads 16C and 16D are vertically opposed (in the Z-axis direction) so as to interpose the magnetic disk 12B therebetween.

FIG. 3 shows the head 16A together with the magnetic disk 12A. The head 16A has a head body formed of ceramics or the like. The head 16A includes a write element and a read element 62 in the head body. The write element includes a recording coil 58 and a recording core 60, and the read element 62 is disposed adjacent to the recording core 60. For example, the write element may comprise an element using a magnetic field produced in a thin-film coil pattern to write data to the magnetic disk 12A. For example, the read element 62 may comprise a giant magnetoresistance (GMR) element or a tunneling magnetoresistance (TuMR) element, which use changes in resistance of a spin valve film or a tunneling film to read data from the magnetic disk 12A. The head 16A has an air bearing surface (ABS) 64 facing the magnetic disk 12A. A protective film 66 is formed on the air bearing surface 64.

Furthermore, in the present embodiment, a heater 126A is provided near the recording core 60 of the head 16A. When the heater 126A is supplied with power and heated, the ABS surface 64 (flying surface) of the head 16A expands and protrudes toward the magnetic disk 12A. A distance from a lower end of the read element 62 to the recording film 72 of the magnetic disk 12A is defined as a clearance (space) between the head 16A and the magnetic disk 12A.

Each of the heads 16B-16D has the same structure as the above-described head 16A. In other words, each of the heads 16B-16D has the same functions as the head 16A depicted in FIG. 3, so that clearances between ABS surfaces of the heads 16B-16D and the magnetic disks can be adjusted by respective heaters 126B-126D (see FIG. 6).

Referring back to FIG. 2, each of the head suspensions 40A-40D cantilevers the corresponding head 16A-16D by functions of gimbal springs (not depicted) provided on its end in the positive direction of the Y-axis. A pressing force is applied to the head 16A toward the surface of the magnetic disk 12A from the head suspension 40A. When the magnetic disk 12A rotates, airflow is produced on the surface of the magnetic disk 12A by the rotation of the magnetic disk 12A. Accordingly, a buoyant force is applied to the head 16A by the airflow. The buoyant force and the aforementioned pressing force are balanced such that the head 16A continues to fly above the magnetic disk 12A with relatively high rigidity while the magnetic disk 12A is rotating. Each of the other head suspensions 40B-40D also operates in the same manner as the head suspension 40A, and the details thereof are not described herein. While the heads 16A-16D are flying above the corresponding magnetic disk, the HSA 20 swings about the bearing member 18 to position the recording/reproducing heads into desired recording tracks on the magnetic disks 12A and 12B.

As depicted in FIG. 2B, the head IC 52 is mounted on a flexible printed circuit board 59 fixed at an end of the housing portion 30 in the positive direction of the X-axis. Wiring patterns and terminals 53 are formed on the flexible printed circuit board 59. A flexible cable connector (not depicted) is connected to the flexible printed circuit board 59. The flexible cable connector connects the flexible printed circuit board 59 to a printed circuit board of the HDD 100.

Furthermore, ends of a long tail (signal transit element), which is not depicted, are connected respectively to the terminals 53 on the flexible printed circuit board 59. The long tail has opposite ends connected to the corresponding heads 16A-16D.

Figure 4:
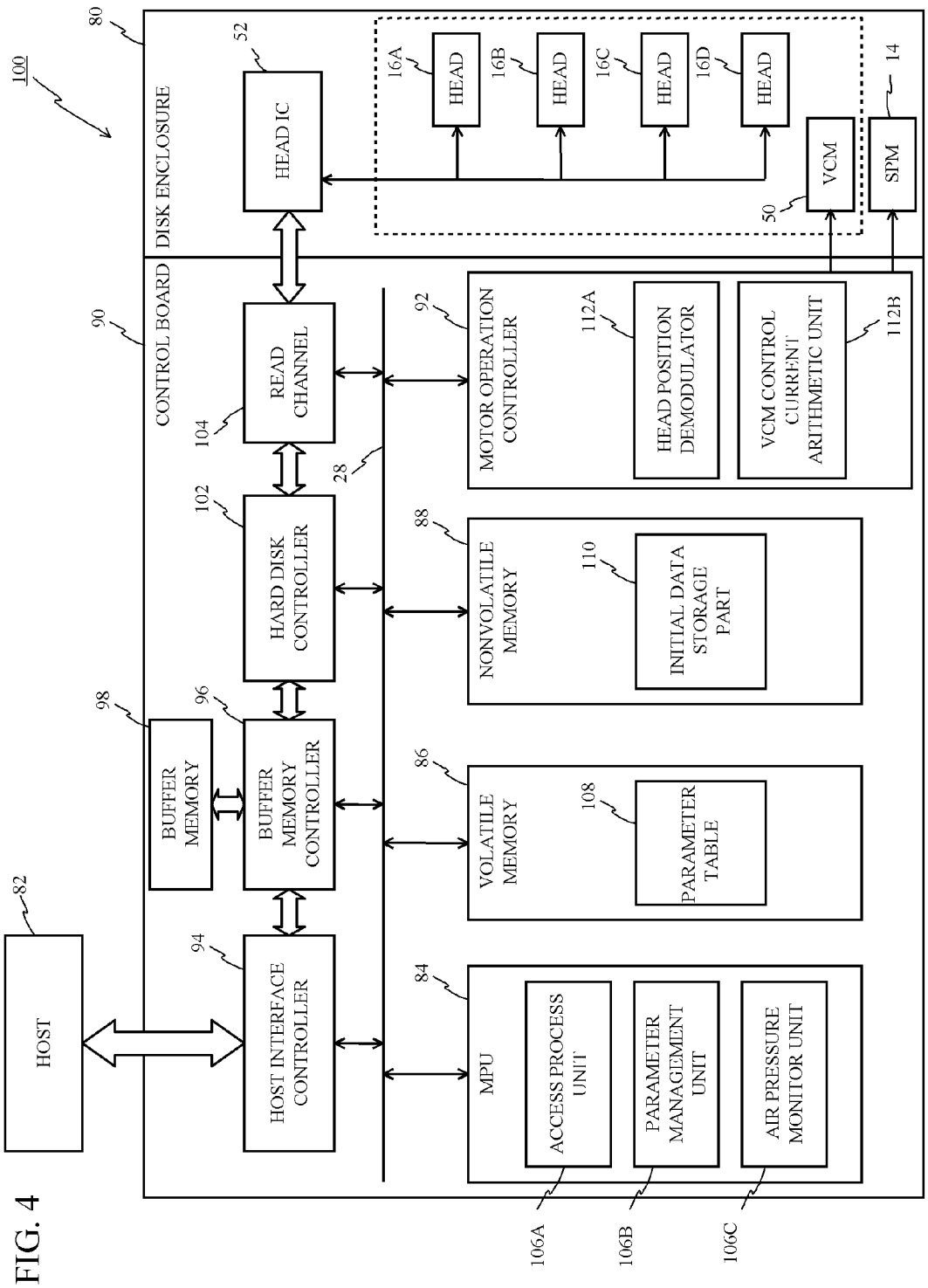
FIG. 4 is a block diagram showing components of the HDD depicted in FIG. 1.

FIG. 4 is a block diagram showing components of the HDD 100. As depicted in FIG. 4, the HDD 100 includes a disk enclosure 80 and a control board 90 having a flying height control circuit for controlling the flying height of the heads.

The disk enclosure 80 includes the aforementioned spindle motor (SPM) 14, voice coil motor (VCM) 50, heads 16A-16D, and head IC 52. The head IC 52 selects one of the heads to perform write or read operation in accordance with a head selection signal, which is based on a write command or a read command from a host 82. The head IC 52 includes a write amplifier for a write operation and a preamplifier for a read operation.

As depicted in FIG. 4, the control board 90 includes an MPU 84, a volatile memory 86, a nonvolatile memory 88, a motor operation controller 92, a host interface controller 94, a buffer memory controller 96, a buffer memory 98, a hard disk controller 102, and a read channel 104. These components are connected to a bus line 28.

The MPU 84 has an access process unit 106A, a parameter management unit 106B, and an air pressure monitor unit 106C. Those units are implemented by programs executed in the MPU 84.

The volatile memory 86 has a parameter table 108 stored therein. The nonvolatile memory 88 has an initial data storage part 110 in which initial data are stored.

The motor operation controller 92 is operable to control operation of the voice coil motor 50 and the spindle motor 14. The motor operation controller 92 has a demodulator 112A for head position and a VCM control current arithmetic unit 112B.

The buffer memory controller 96 is operable to control the buffer memory 98. The read channel 104 functions as a write modulator and a read demodulator.

Next, the details of functions of the MPU 84, the volatile memory 86, and the head IC 52 will be described with reference to block diagrams depicted in FIGS. 5 and 6.

Figure 5:
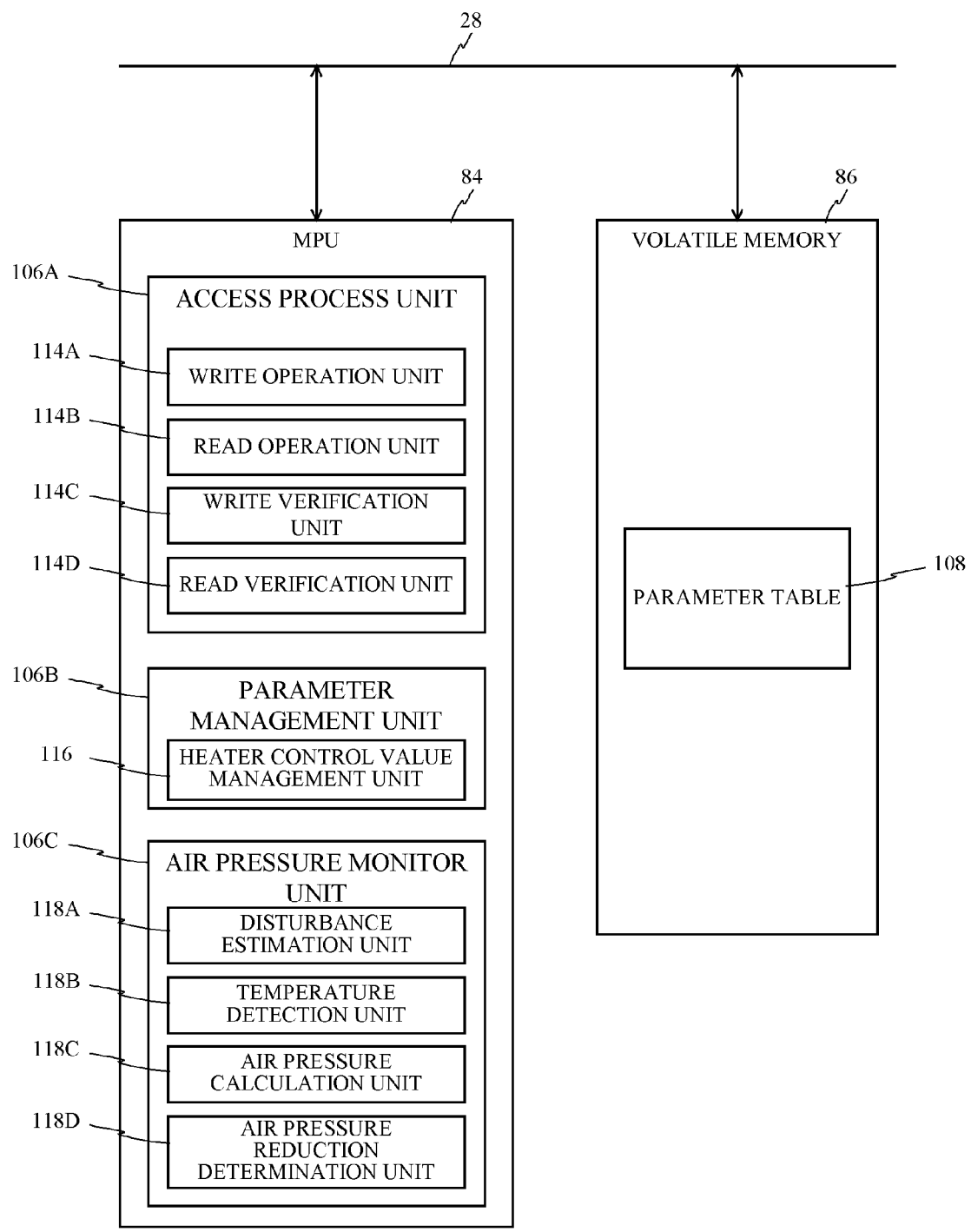
FIG. 5 is a functional block diagram of a microprocessing unit (MPU) in the HDD depicted in FIG. 4.

As depicted in FIG. 5, the access process unit 106A of the MPU 84 includes a write operation unit 114A, a read operation unit 114B, a write verification unit 114C, and a read verification unit 114D. Those units 114A-114D are implemented by a firmware program of the MPU 84. The parameter management unit 106B of the MPU 84 includes a heater control value management unit 116 operable to determine heater control values for controlling the flying height of the heads 16A-16D. The heater control value management unit 116 is implemented by a firmware program of the MPU 84. Furthermore, the air pressure monitor unit 106C of the MPU 84 includes a disturbance estimation unit 118A operable to estimate a disturbance based on positioning error data, a temperature detection unit 118B, an air pressure calculation unit 118C operable to calculate an air pressure in the enclosure 10 based on the disturbance estimate, and an air pressure reduction determination unit 118D serving as verification determination unit operable to determine whether to verify data written to the disks 12A and 12B based on the calculated air pressure. Those units 118A-118D are implemented by a firmware program of the MPU 84.

Figure 6:
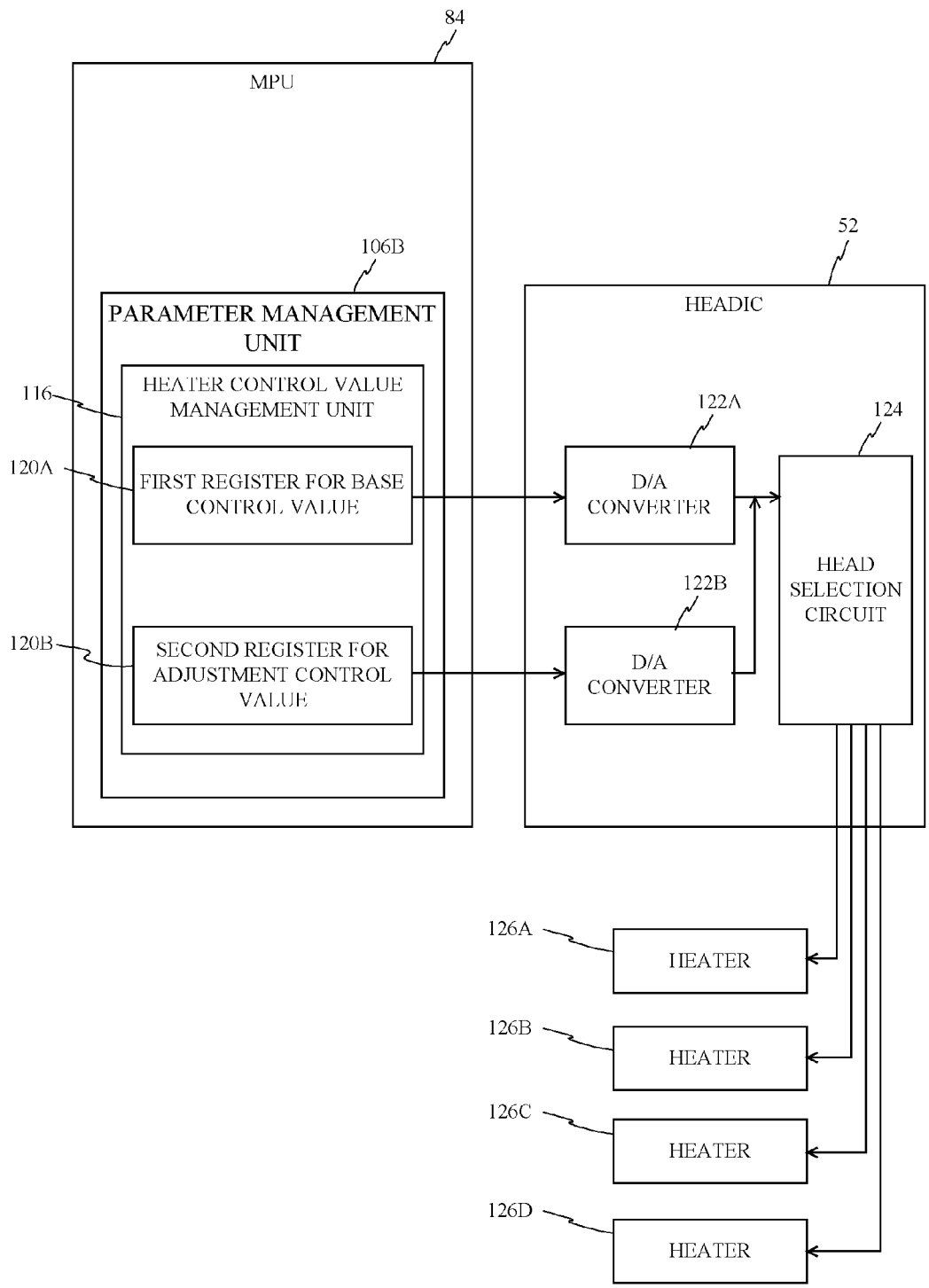
FIG. 6 is a functional block diagram of a parameter management unit in the MPU and a head IC in the HDD depicted in FIG. 4.

As depicted in FIG. 6, the heater control value management unit 116 in the parameter management unit 106B has a first register 120A for a base control value for heater control and a second register 120B for an adjustment control value for heater control. The first register 120A and the second register 120B use parameters stored on the parameter table 108 in the volatile memory 86 (see FIG. 5) to determine a base control value for heater control and an adjustment control value for heater control.

As depicted in FIG. 6, the head IC 52 has a first D/A converter 122A, a second D/A converter 122B, and a head selection circuit 124. The first D/A converter 122A is operable to perform D/A conversion on a control value inputted from the first register 120A. The second D/A converter 122A is operable to perform D/A conversion on a control value inputted from the second register 120B. The head selection circuit 124 is operable to select one of heaters 126A-126D to be controlled by using control values inputted from the D/A converters 122A and 122B and to control the selected heater.

Next, a specific sequence of operations in the HDD 100 thus constructed will be described with reference to FIGS. 7 to 17.

Figure 7:
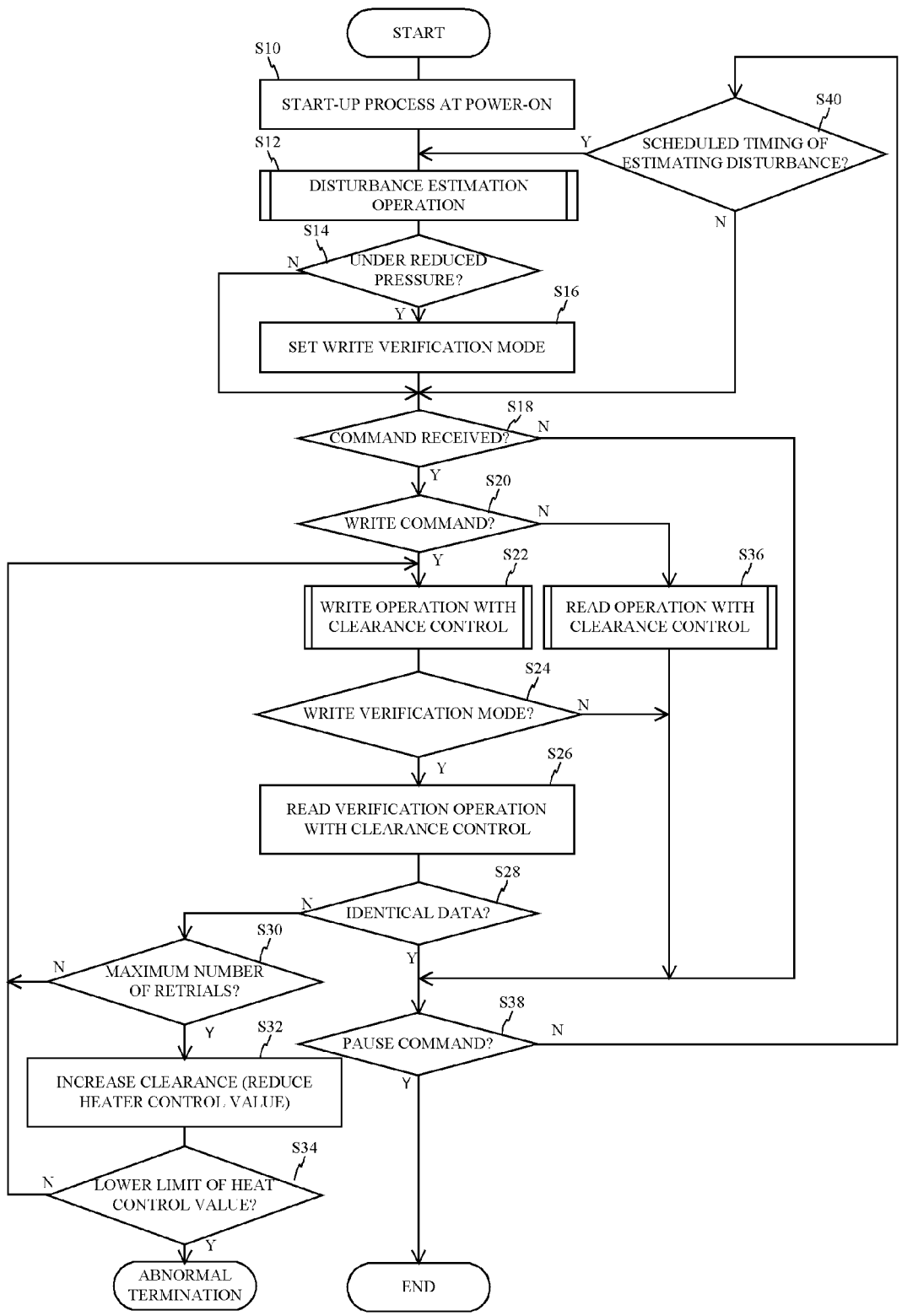
FIG. 7 is a flow chart showing an overall process of the HDD in the first embodiment.

FIG. 7 is a flow chart showing the overall process of the HDD 100 in the first embodiment. The process depicted in FIG. 7 is performed after shipment of the HDD 100.

In Step S10 of FIG. 7, a start-up process (initialization process) is performed in respective portions of the HDD 100 when the HDD 100 is supplied with power. In Step S12, a disturbance estimation subroutine is executed.

Figure 8:
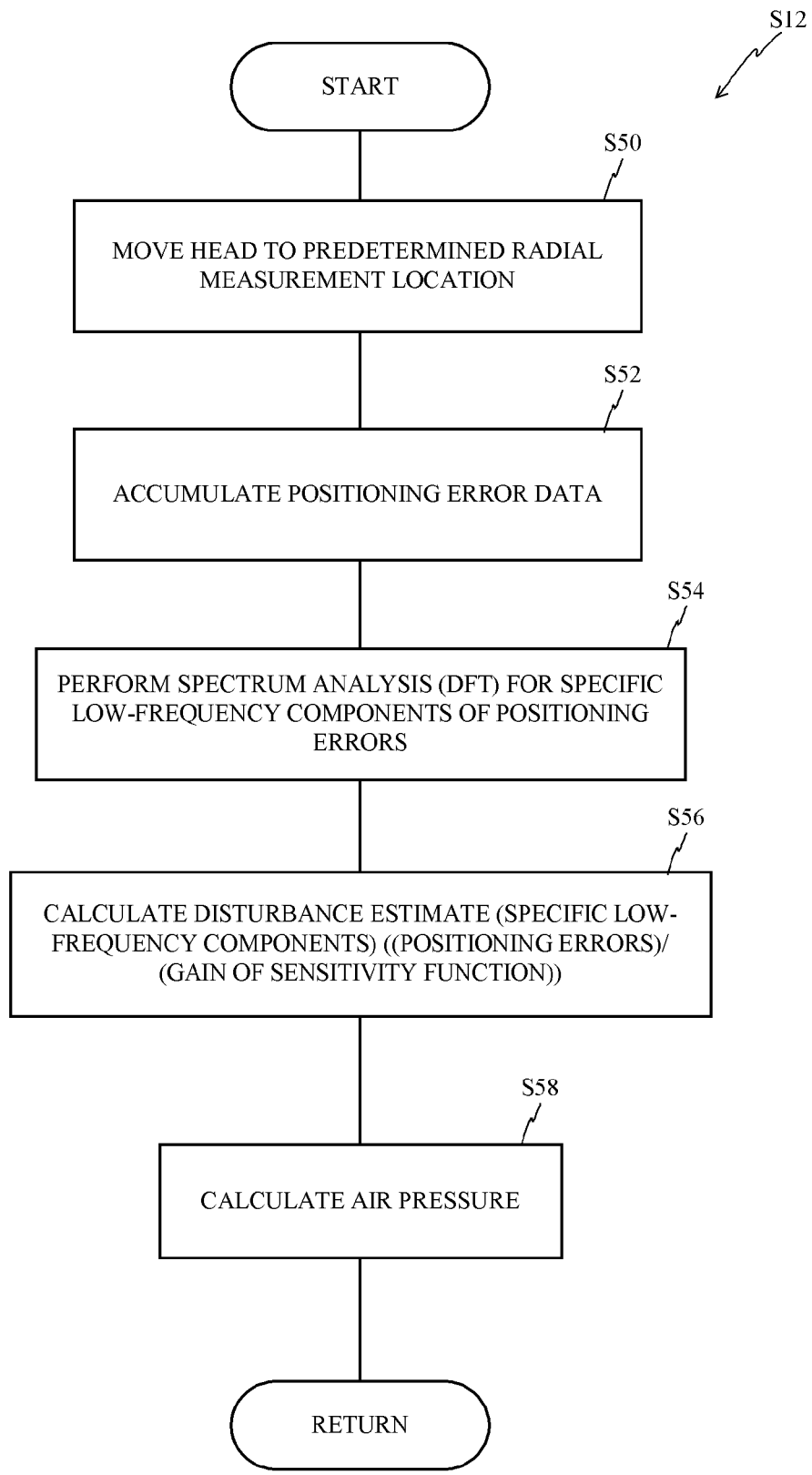
FIG. 8 is a flow chart showing a process of a subroutine S12 depicted in FIG. 7.

FIG. 8 shows the subroutine of Step S12. As depicted in FIG. 8, in Step S50, the motor operation controller 92 (the VCM control current arithmetic unit 112B) moves the heads 16A-16D to predetermined radial measurement locations. Specifically, the motor operation controller 92 (the VCM control current arithmetic unit 112B) controls the VCM 50 so as to swing the HSA 20 and position the heads 16A-16D to the predetermined radial locations.

Figure 20:
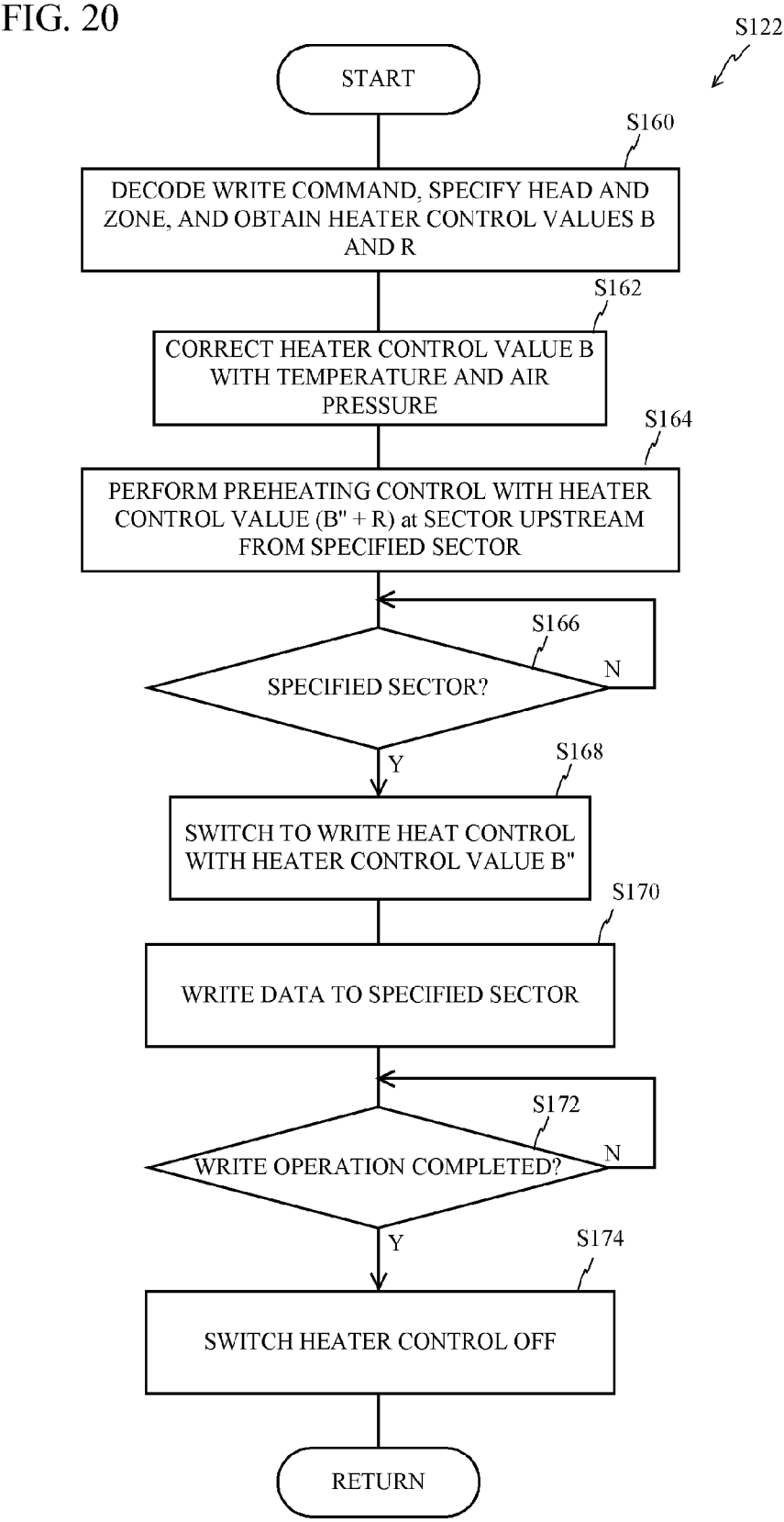
FIG. 20 is a flow chart showing a process of a subroutine S122 depicted in FIG. 18.
Figure 21:
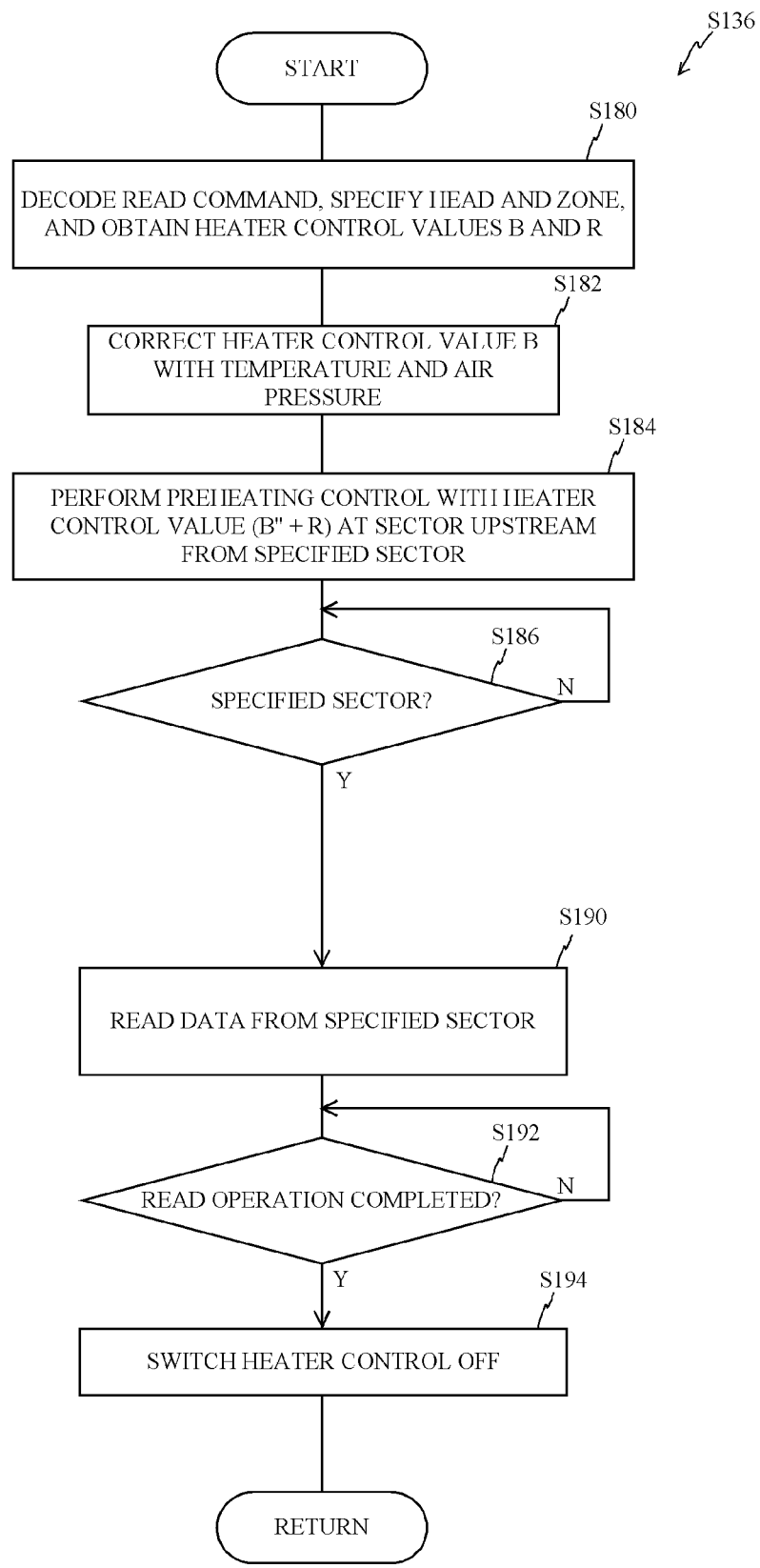
FIG. 21 is a flow chart showing a process of a subroutine S136 depicted in FIG. 18.

Next, in Step S52, the air pressure monitor unit 106C (the disturbance estimation unit 118A) in the MPU 84 accumulates data on errors in positioning (positioning error data). Specifically, data on errors in positioning at the predetermined radial locations are accumulated for a predetermined number of rotations. For example, it is assumed that there are 200 servo frames in one rotation of each of the magnetic disks 12A and 12B (along one round at the predetermined radial measurement locations) and that data for 100 rotations are to be obtained. As depicted in FIG. 9A, 20,000 (=100×200) pieces of positioning error data, such as (1-1), ..., (1-100), ..., (2-1), ..., (100-200), are obtained.

Next, the disturbance estimation unit 118A calculates averages for the same rotational angles (averages of data in each column (in the vertical direction) of the table depicted in FIG. 9A). Those averages are synchronous components of the positioning error data in each column (RPE) and are accordingly defined as RPE1, RPE2, ..., RPE200, respectively, as depicted in FIG. 9B.

Then the disturbance estimation unit 118A subtracts the corresponding RPE (RPE1, RPE2, ..., RPE200) from each of the positioning error data (1-1), ..., (1-100), ..., (2-1), ..., (100-200). The subtraction results are asynchronous components of the positioning error data (NRPE) and are accordingly defined as $NRPE_{1-1}, \ldots, NRPE_{1-100}, \ldots, NRPE_{2-1}, \ldots, NRPE_{100-200}$, as depicted in FIG. 9C.

Referring back to FIG. 8, in the next Step S54, the disturbance estimation unit 118A performs a frequency analysis on those data $NRPE_{1-1}$-$NRPE_{100-200}$. In this case, discrete Fourier transform (DFT) is used for the frequency analysis.

For DFT, Xn and Yn are calculated by $$Xn = NRPE_{n-m} \times \cos(x) \qquad (1)$$

$$Yn = NRPE_{n-m} \times \sin(x) \qquad (2)$$

where x=360/(tn×1), 360/(tn×2), ..., 360, and tn=n/f (=(a period of an extracted frequency f)×n).

The disturbance estimation unit 118A repeats the above calculations (1) and (2) in ranges of n=1 to 100 and m=1 to 200. With the obtained Xn and Yn, the disturbance estimation unit 118A obtains NRPE at a frequency f by $$(NRPE\ at\ f) = \Sigma(Xn \times \cos(x) + Yn \times \sin(x)) \qquad (3)$$

Figure 10A:
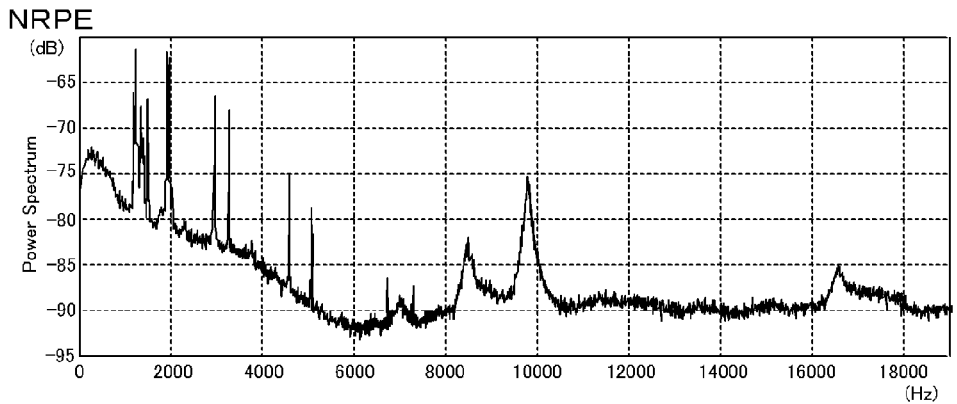
FIGS. 10A to 10C are graphs explanatory of a method of calculating a disturbance estimate.

FIG. 10A shows an example of the frequency analysis result.

Figure 10B:
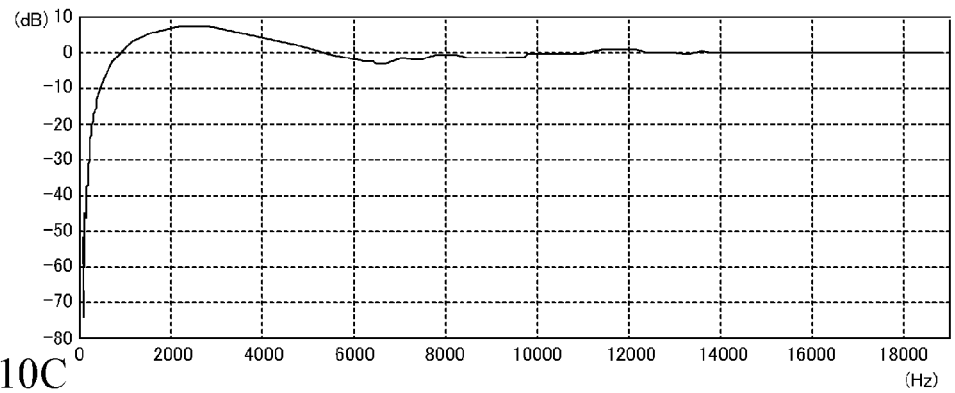
Figure 10C:
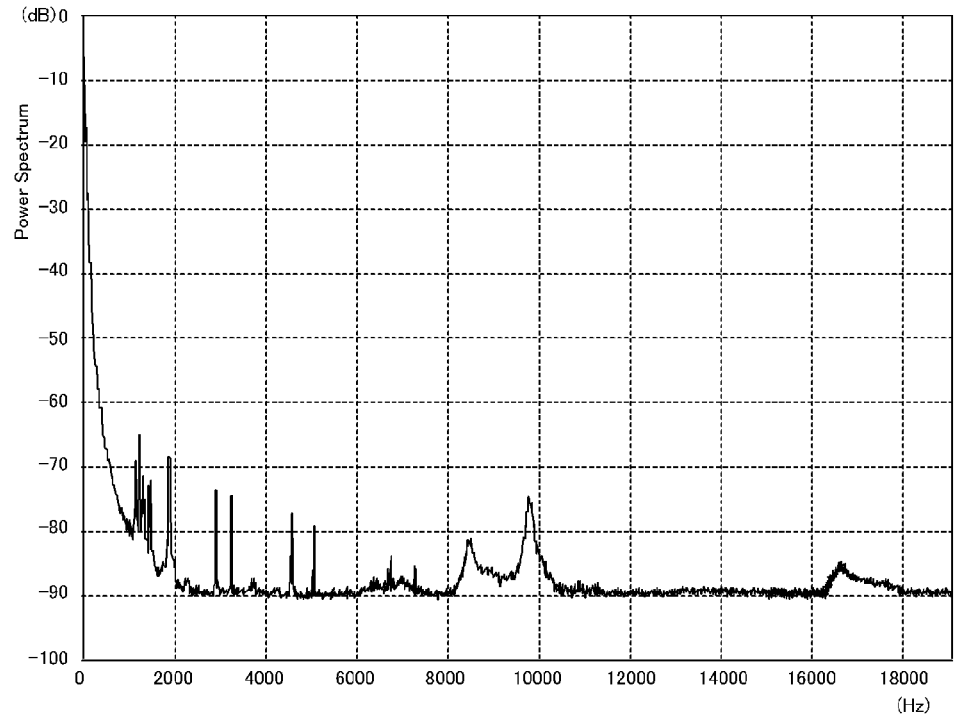

Referring back to FIG. 8, in the next Step S56, the disturbance estimation unit 118A calculates a disturbance estimate. In the present embodiment, the disturbance estimation unit 118A divides the frequency analysis result of the positioning errors by a gain of a sensitivity function indicating servo characteristics of the head as depicted in FIG. 10B, thereby obtaining a disturbance estimate (estimated non-repeatable runout (NRRO)). FIG. 10C shows an example of the calculation results of the estimated NRRO.

When the disturbance estimate is obtained, the temperature detection unit 118B detects the current temperature Tr in the enclosure 10 and stores it in the volatile memory 86.

Thereafter, in Step S58, the air pressure calculation unit 118C calculates the current air pressure P (the air pressure in the enclosure 10) from the disturbance estimate calculated by the disturbance estimation unit 118A.

Now the calculation of the current air pressure P will be described.

Figure 11A:
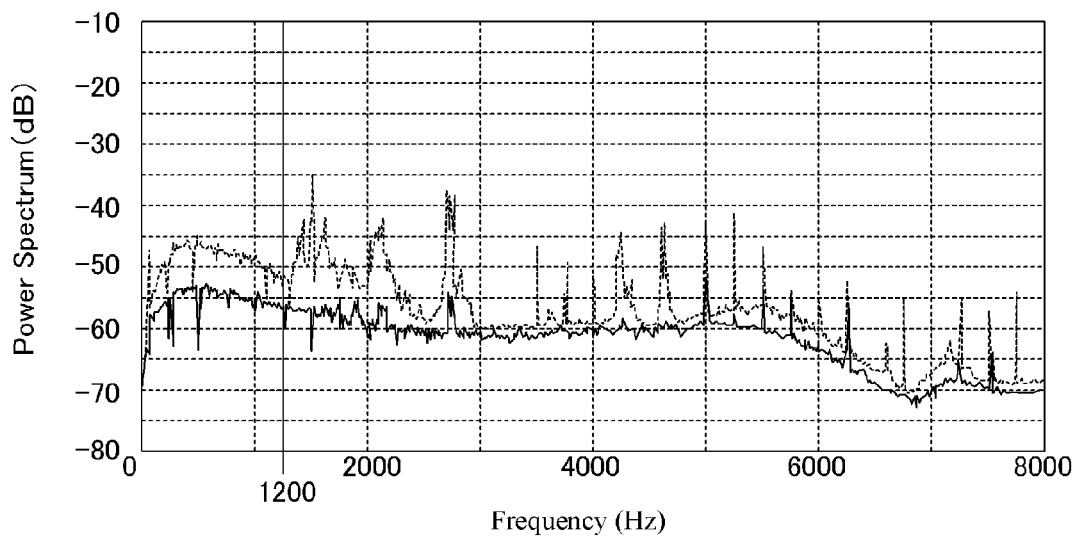
FIGS. 11A and 11B are graphs explanatory of variations of positioning error data due to air pressures.
Figure 11B:
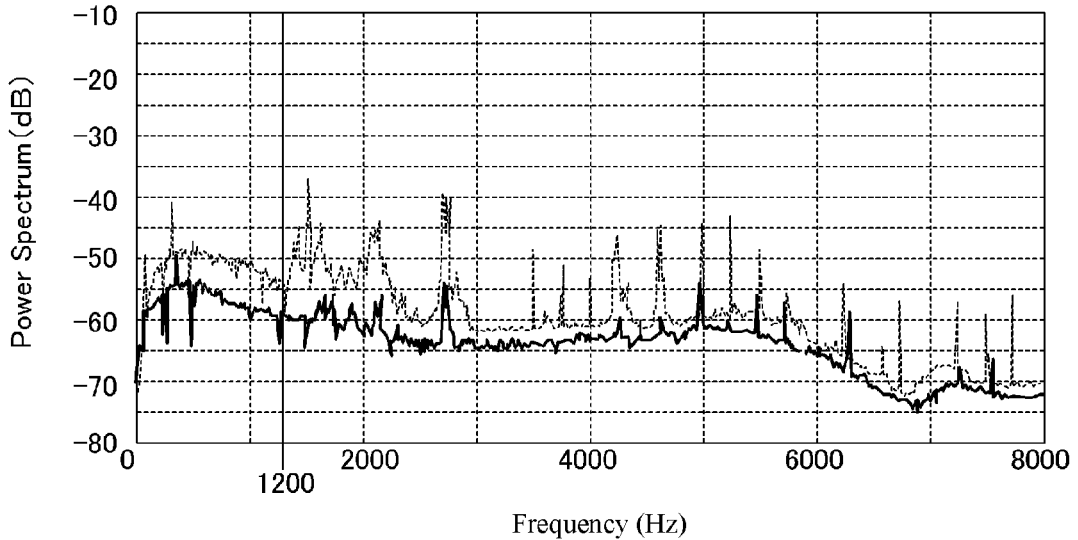

FIG. 11A shows frequency spectra of positioning error at a predetermined location on an outer radius of the magnetic disks 12A and 12B. The frequency spectra of FIG. 11A include a frequency spectrum measured at an altitude of 0 m (or under an air pressure corresponding to an altitude of 0 m) and a frequency spectrum measured at an altitude of 3,000 m (or under an air pressure corresponding to an altitude of 3,000 m). FIG. 11B shows frequency spectra of positioning error at a predetermined location on an inner radius of the magnetic disks 12A and 12B, which were measured under the same conditions as those in FIG. 11A. Those measurement results were obtained by experiments conducted in a chamber having a variable air pressure. As is apparent from those figures, the frequency spectra varied depending upon the altitude (or the air pressure). Accordingly, it is conceivable that disturbance estimates calculated from the frequency spectra will vary depending upon the altitude (or the air pressure).

Therefore, the current air pressure P can be calculated by $$P = Pb + Kp \times (D - Db) \qquad (4)$$

where Pb is a reference air pressure, Kp is an air pressure conversion coefficient, D is a current disturbance estimate, and Db is a reference disturbance estimate.

The reference disturbance estimate Db is calculated in an experiment conducted before the HDD 100 is shipped. In the experiment before the shipment, the disturbance estimation unit 118A estimates a disturbance under a reference temperature (e.g., 30° C.) and a reference air pressure Pb (e.g., an air pressure corresponding to an altitude 0 m) in the same manner as in Steps S50-S56. This estimated disturbance is defined as the reference disturbance estimate Db. In this case, the head which measures positioning error is positioned to the same location as the radial measurement location used in Step S50 of FIG. 8.

The reference disturbance estimate Db and the reference air pressure Pb at the time of measurement of the reference disturbance estimate Db are stored in the initial data storage part 110 of the nonvolatile memory 88 depicted in FIG. 4. Furthermore, a temperature Ts detected by the temperature detection unit 118B in the experiment before the shipment (the device temperature as the reference temperature) is also stored in the initial data storage part 110.

It is preferable to extract low-frequency components from the disturbance estimates D and Db and use the extracted components for the calculation in the formula (4). For example, the components may be extracted in low frequencies of 0 to 1,200 Hz, preferably 0 to 600 Hz, more preferably about 600 Hz.

Figure 12A:
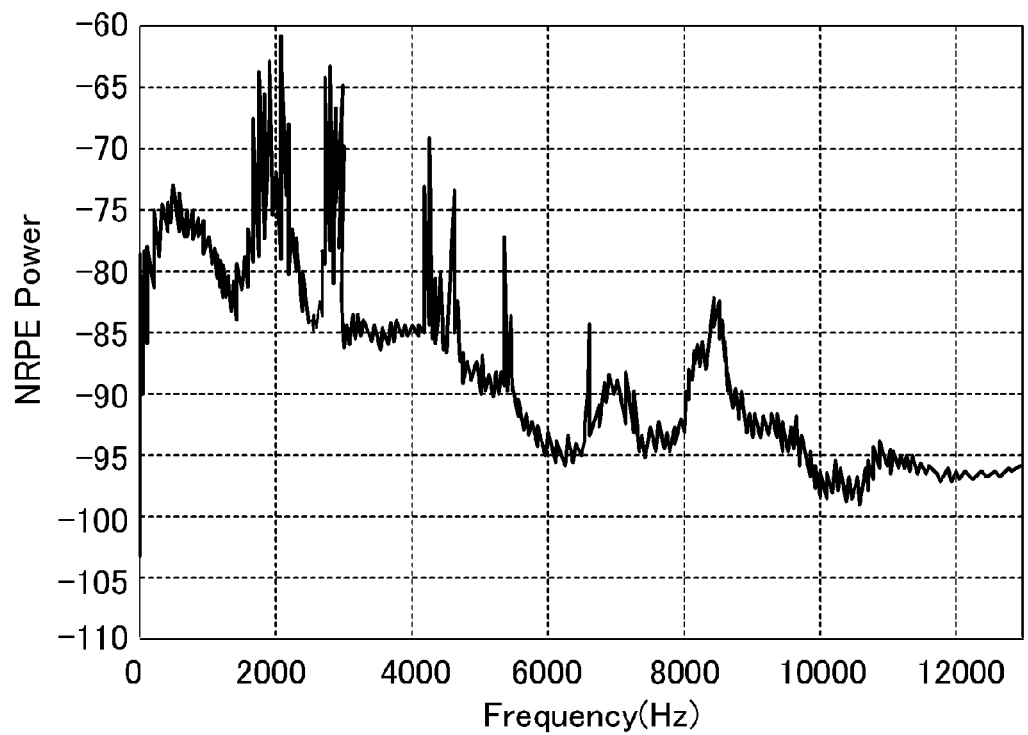
FIGS. 12A and 12B are graphs explanatory of factors in positioning error with respect to frequencies.
Figure 12B:
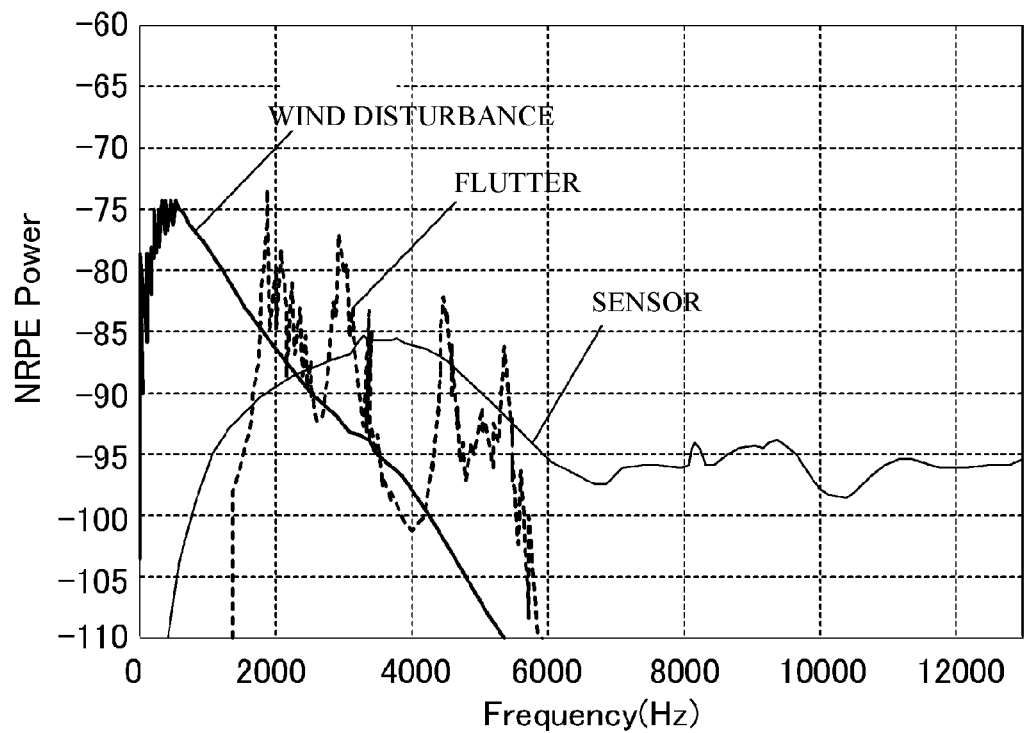

Extraction of low-frequency components from the disturbance estimates D and Db is preferable for the following reasons. FIG. 12A is a graph showing an example of actually measured values of NRPE. FIG. 12B is a graph in which NRPE of FIG. 12A is decomposed (separated) by several factors. As depicted in the graph of FIG. 12B, almost all of NRPE in a range of from 0 Hz to about 600 Hz is attributed to wind disturbances. Particularly, wind disturbances greatly affect NRPE around 600 Hz. By contrast, NRPE in a range of from about 600 Hz to about 1,200 Hz is attributed to wind disturbances and measurement error in the sensor. In a range above 1,200 Hz, NRPE is attributed to flutter components in addition to wind disturbances and measurement error.

Meanwhile, it has been known that the magnitude of wind disturbances is greatly affected by an air pressure. Therefore, an air pressure P can be calculated with accuracy by using disturbances in the aforementioned range of from 0 Hz to 1,200 Hz, preferably from 0 Hz to 600 Hz, more preferably about 600 Hz. Thus, for calculation of an air pressure by the air pressure reduction determination unit 118D, it is preferable to extract low-frequency components (having frequencies of from 0 Hz to 1,200 Hz, preferably from 0 Hz to 600 Hz, more preferably about 600 Hz) from the disturbance estimates D and Db.

Referring back to FIG. 7, in the next Step S14, the air pressure reduction determination unit 118D determines based on the air pressure P calculated in Step S58 whether or not the environment is under a reduced pressure. In this case, a pressure reduction detection threshold Pth is stored in the initial data storage part 110 of the nonvolatile memory 88. The air pressure reduction determination unit 118D compares the air pressure P with the pressure reduction detection threshold Pth and determines that the environment is under a reduced pressure if P<Pth.

If it is determined that the environment is under a reduced pressure, then a write verification mode is set in Step S16 by switching on the write verification unit 114C in the access process unit 106A of the MPU 84. Then Step S18 proceeds. If it is determined that the environment is not under a reduced pressure, then Step S18 proceeds without any intervening steps.

In Step S18, the host interface controller 94 determines whether or not a command has been received from the host 82. The host interface controller 94 continuously monitors receipt of commands from the host 82. If it is determined that no command has been received, then Step S38 proceeds. If it is determined that a command has been received, then the host interface controller 94 determines in Step S20 whether or not the received command is a write command. If the received command is a write command, then a write operation subroutine with a clearance control is executed (Step S22).

Figure 13:
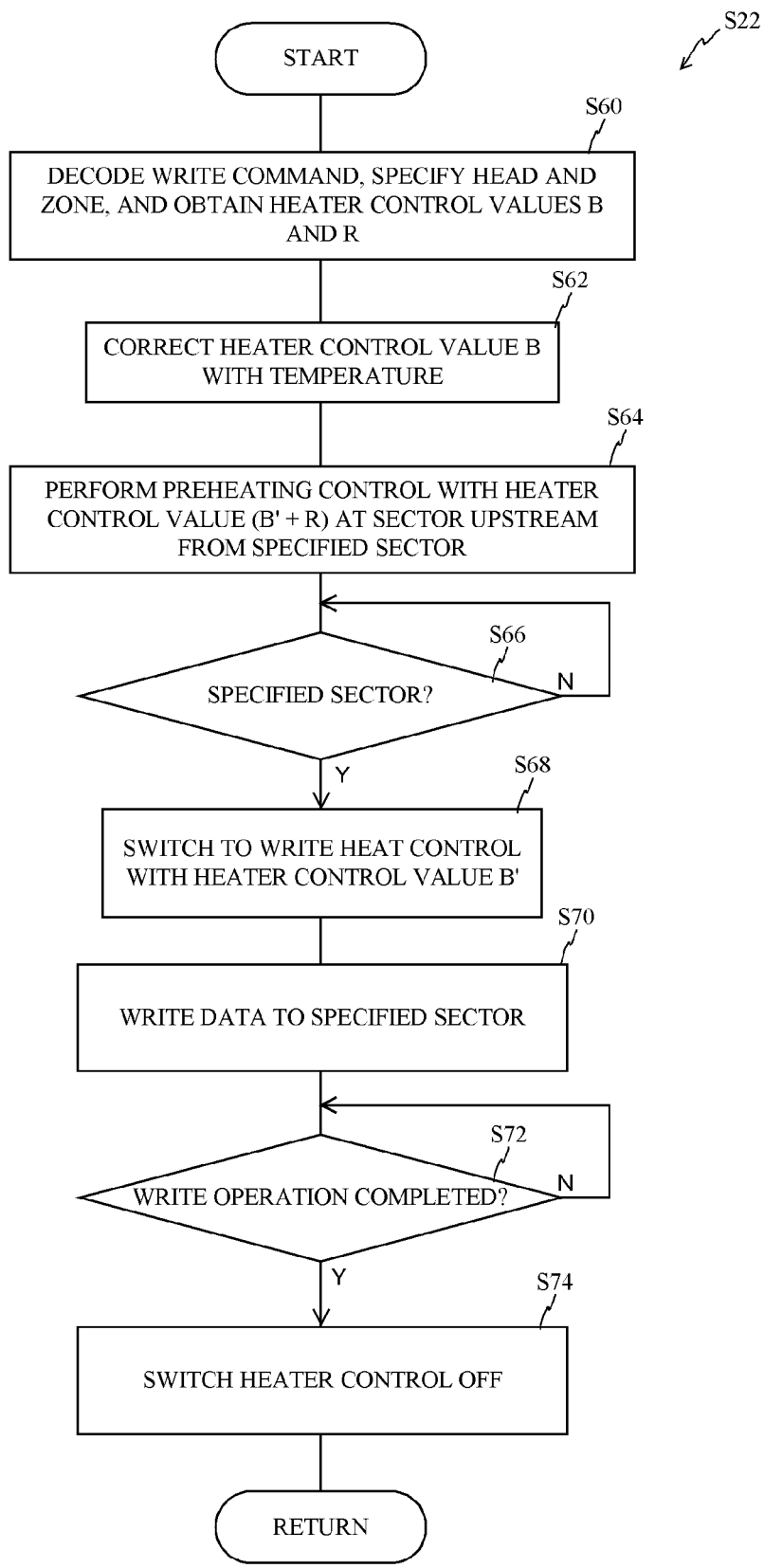
FIG. 13 is a flow chart showing a process of a subroutine S22 depicted in FIG. 7.

The write operation subroutine with clearance control (Step S22) is performed as depicted in FIG. 13. In Step S60, the write operation unit 114A decodes the write command and specifies a head and a zone. The parameter management unit 106B obtains heater control values corresponding to the specified head and zone, which include a base control value B and an adjustment control value R to control the corresponding heater. In this case, the parameter management unit 106B retrieves necessary heater control values B (one of B1 to B4) and R (one of R1 to R4) from a table of heater control values (see FIG. 14), which is included in the parameter table 108 of the volatile memory 86. The base control values B1-B4 are values to be used for a device temperature under conditions of a reference room temperature (e.g., 30° C.). If a device temperature differs from the device temperature under conditions of the reference room temperature, then the base control values B1-B4 should be corrected as described later.

Then, in Step S62, the heater control value management unit 116 of the parameter management unit 106B (the first register 120A depicted in FIG. 6) corrects the base control value so as to conform to the temperature. In this case, assuming that the base control value B1 is to be corrected, a corrected base control value B1' is obtained by $$B1'=B1+Kb\times(Tr-Ts) \quad (5)$$

where Tr is a current internal temperature of the device, Ts is a device temperature under conditions of a reference room temperature, and Kb is a temperature correction coefficient.

The other base control values B2-B4 can also be corrected in the same manner as described above. Those corrected base control values for the base control values B2-B4 are denoted by B2'-B4', respectively. In the following description, the base control value B' is used to collectively refer to the corrected base control values B1'-B4'.

Next, in Step S64, the head selection circuit 124 of the head IC 52 starts a preheating control with the heater control value (B1'+R) at a sector upstream from the specified sector. In other words, the head selection circuit 124 begins to supply power to the corresponding heater (126A-126D) based on the heater control value. In the present embodiment, expansion and protrusion of the ABS surface of the head should be completed by supplying power with the heater in order to ensure a desired clearance for writing until the head reaches a frame including the specified sector. Therefore, the aforementioned preheating control is performed.

Subsequently, in Step S66, the head selection circuit 124 awaits until the head reaches the target sector. When the head reaches the target sector, then Step S68 proceeds. In Step S68, the head selection circuit 124 replaces the control value of the corresponding heater 126A-126D with the base control value B'.

Then, in Step S70, the write operation unit 114A writes data to the specified sector. In this case, the MPU 84 (the write operation unit 114A) decodes the write command and stores the received write data in the buffer memory 98 as needed. Thereafter, the hard disk controller 102 converts the write data into a predetermined data format and adds an ECC code by an ECC process. The write modulator in the read channel 104 performs a scrambling process, an RLL encode process, and a write compensation process. Thereafter, the write element of the selected head writes the write data to the magnetic disk via the write amplifier of the head IC 52 (the head selection circuit 124).

At that time, the MPU 84 supplies a signal for positioning the head to the motor operation controller 92, which includes the VCM control current arithmetic unit 112B. The motor operation controller 92 controls the voice coil motor 50 such that the head (16A-16D) follows the specified track.

When the write operation of the write data is thus completed (Step S72), the head selection circuit 124 switches the heater control off in Step S74. Thereafter, Step S24 of FIG. 7 proceeds.

In Step S24, it is determined whether or not the write verification mode has been set in Step S16 (the environment is under a reduced pressure and the write verification unit 114C has been switched on). If it is determined that the write verification mode has been set, then Step S26 proceeds. In Step S26, the write verification unit 114C executes a read verification process with a clearance control. In this case, the data written to the target sector in Step S70 are read, and it is determined in Step S28 whether or not the written data are identical to the data that were instructed to be written. If it is determined that the written data are not identical, then the write verification unit 114C determines in Step S30 whether or not the maximum number of retrials have been made. The maximum number of retrials refers to the number of times to allow writing errors and is predetermined in a design process of the device. In this case, since the write operation has been performed only once, it is determined that the maximum number of retrials have not been made, and the process returns to Step S22.

Then the write operation of Step S22 and the read verification operation of Step S26 are repeated until the determination of Step S28 is affirmed or the determination of Step S30 is affirmed.

If it is determined in Step S30 that the number of attempts exceeds the maximum number of retrials, then the head selection circuit 124 reduces the heater control value to increase the clearance in Step S32.

The clearance between the head and the magnetic disk is increased in Step S32 for the following reasons. According to the experiments made by the inventor, as depicted in FIG. 15A, a somewhat proportional relationship has been found between the altitude (i.e., the air pressure) and the space formed between the head and the magnetic disk.

Figure 15A:
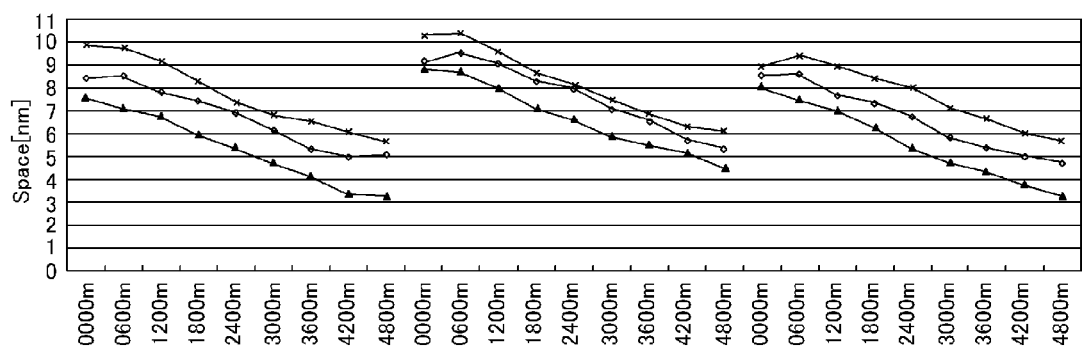
FIG. 15A is a graph showing a relationship between altitudes (air pressures) and clearances.

Thus, as depicted in FIG. 15A, the space formed between the head and the magnetic disk is reduced as the air pressure is reduced. Accordingly, in order to prevent contact of the head with the magnetic disk which would be caused by the reduced space, the clearance is increased in consideration of the results of the read verification operation (i.e., in a case where writing errors occur in succession). In this manner, the clearance is changed only if data writing errors occur. The clearance is not changed as long as the data write operation is correctly performed. Thus, the number of operations for changing the clearance can be minimized.

Figure 15B:
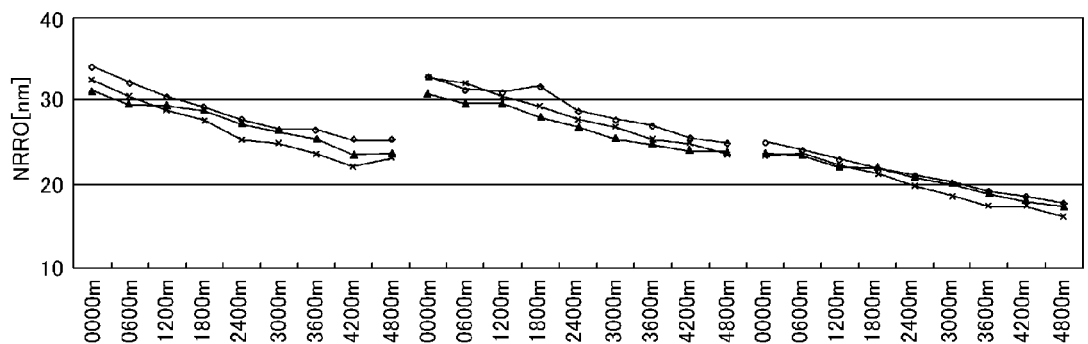
FIG. 15B is a graph showing a relationship between altitudes (air pressures) and positioning errors.
Figure 16:
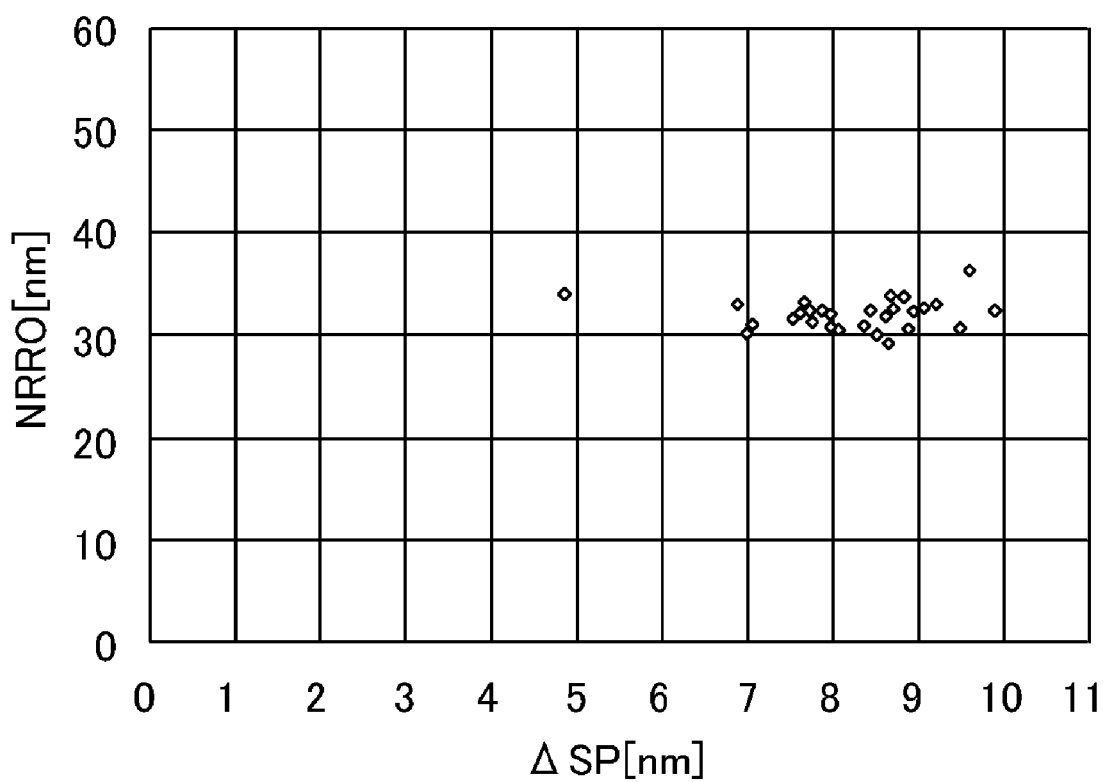
FIG. 16 is a graph showing a relationship between clearances and positioning errors.

As depicted in FIG. 15B, there is a somewhat proportional relationship between the altitude (i.e., the air pressure) and the positioning errors. By contrast, as depicted in FIG. 16, no correlation is found between the positioning error and the space formed between the head and the magnetic disk. Accordingly, it is conceivable that variations of the positioning errors are not caused by the size of the space formed between the head and the magnetic disk, but by the altitude (i.e., the air pressure). Therefore, increase of the clearance as performed in Step S32 hardly affects production of positioning errors.

Next, in Step S34, the head selection circuit 124 determines whether or not the heater control value has reached a lower limit. If it is determined that the heater control value has not reached the lower limit, then the process returns to Step S22 and repeats the operations of Steps S22 and S26 and the determinations of Steps S28 and S30. If it is determined that the heater control value has reached the lower limit, then the head selection circuit 124 cannot continue the heater control. Accordingly, an abnormal status is reported, and all of the operations depicted in FIG. 7 are terminated.

If it is determined in Step S28 of FIG. 7 that the written data are identical to the data that were instructed to be written, then Step S38 proceeds.

Meanwhile, if it is determined in Step S24 that no write verification mode has been set because the environment is not under a reduced pressure, then Step S38 proceeds without any intervening steps.

Furthermore, if it is determined in Step S20 that the received command is not a write command but a read command, then Step S36 proceeds so as to execute a read operation subroutine with a clearance control.

Figure 17:
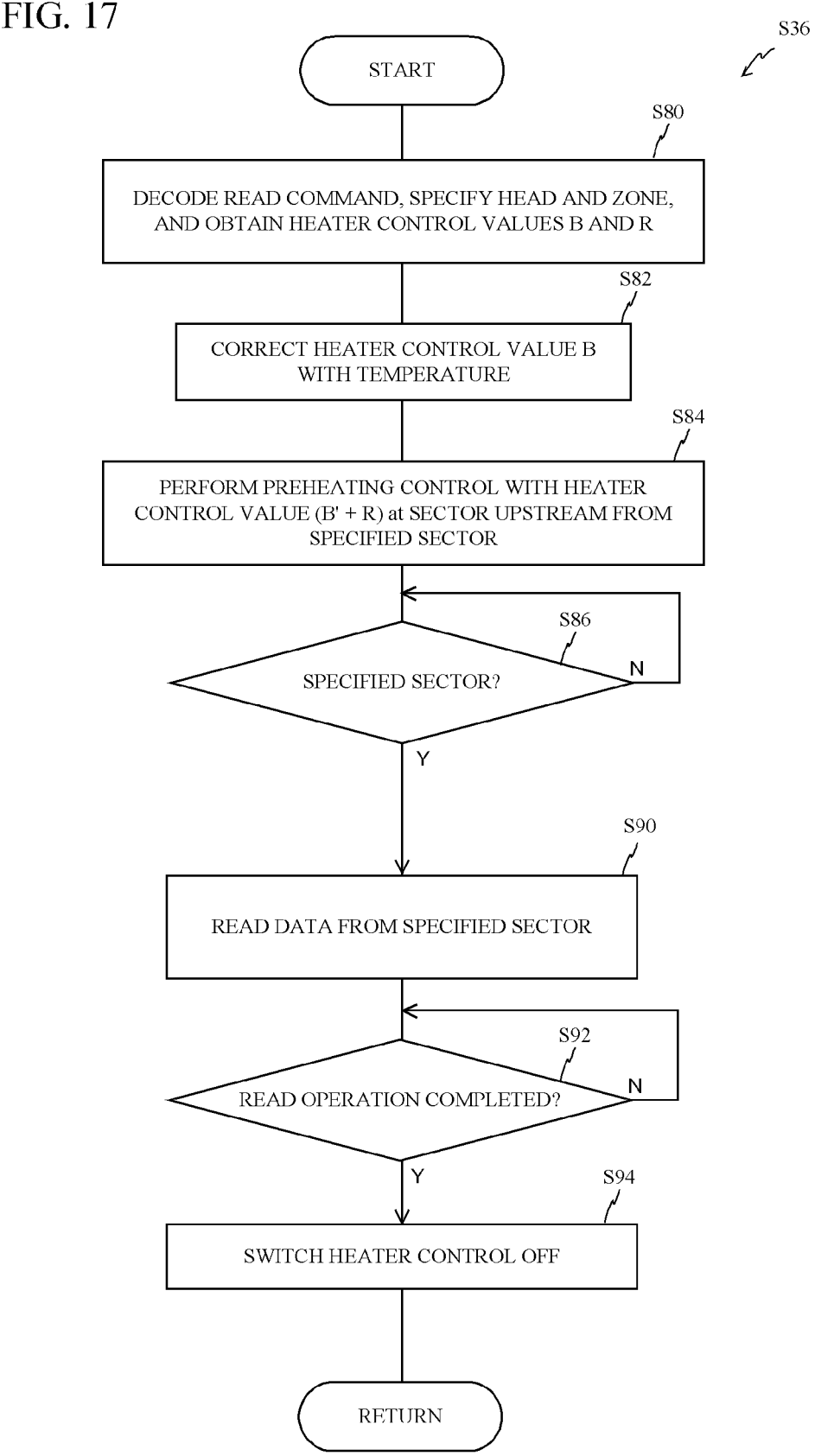
FIG. 17 is a flow chart showing a process of a subroutine S36 depicted in FIG. 7.

The read operation subroutine of Step S36 is performed in the following manner. As depicted in FIG. 17, in Step S80, the read operation unit 114B decodes the read command and specifies a head and a zone. The parameter management unit 106B obtains heater control values corresponding to the specified head and zone, which include a base control value B and an adjustment control value R to control the corresponding heater. In this case, the read operation unit 114B retrieves heater control values B (one of B1 to B4) and R (one of R1 to R4) from the table of heater control values (see FIG. 14), which is included in the parameter table 108 of the volatile memory 86.

Then, in Step S82, the heater control value management unit 116 of the parameter management unit 106B (the first register 120A depicted in FIG. 6) corrects the base control value so as to correspond to the temperature. In this case, a corrected base control value B' can be obtained by using the aforementioned formula (5).

Next, in Step S84, the head selection circuit 124 of the head IC 52 starts a preheating control with the heater control value (B'+R) at a sector upstream from the target sector. In other words, the head selection circuit 124 begins to supply power to the corresponding heater (126A-126D) based on the heater control value.

Subsequently, in Step S86, the head selection circuit 124 awaits until the head reaches the specified sector. When the head reaches the specified sector, then Step S90 proceeds. In Step S90, the read operation unit 114B reads data from the specified sector. In this case, the head selection circuit 124 of the head IC 52 selects one of the heads based on the results that the MPU 84 (the read operation unit 114B) has decoded the read command received from the host 82. The signal read by the read element of the selected head is amplified by the preamplifier. Then the read signal is inputted to the read demodulator of the read channel 104. Thus, the read data are demodulated by partial response maximum likelihood (PRML) or the like. The hard disk controller 102 performs an ECC process to detect and correct errors. The read data are buffered in the buffer memory 98 and transferred from the host interface controller 94 to the host 82. When the read operation of the data is thus completed (Step S92), the head selection circuit 124 switches the heater control off in Step S94. Thereafter, Step S38 of FIG. 7 proceeds.

In Step S38, the host interface controller 94 determines whether or not the host has sent a pause command. If it is determined that the host has not sent a pause command, then Step S40 proceeds.

In Step S40, it is determined whether or not a disturbance estimate is scheduled to be measured at the present timing. If it is determined that a disturbance estimate is not scheduled to be measured at the present timing, then Step S18 proceeds. Thereafter, the aforementioned operations are repeated.

Meanwhile, if it is determined in Step S40 that a disturbance estimate is scheduled to be measured at the present timing, then Step S12 proceeds so as to perform the aforementioned operations subsequent to the measurement of a disturbance estimate.

The operations and determinations depicted in FIG. 7 are repeated until it is determined in Step S38 that the host has sent a pause command. If it is determined in Step S38 that the host has sent a pause command, then all of the operations depicted in FIG. 7 are terminated.

As described above, according to the present embodiment, the heads 16A-16D are positioned to radial measurement locations of the magnetic disks to obtain data on error in positioning of the heads 16A-16D. The positioning error data are subjected to a frequency analysis. The current air pressure P is calculated based on the positioning error data relating to frequencies of 1,200 Hz or less. Based on the current air pressure P, the flying height of the heads 16A-16D is adjusted with respect to the corresponding magnetic disk. The air pressure is calculated based on positioning error information that is greatly affected by wind disturbances (positioning error information relating to frequencies of 1,200 Hz, preferably 0 Hz to 600 Hz, more preferably about 600 Hz). Therefore, information relating to the air pressure can be calculated with high accuracy without use of any air pressure sensor. Thus, control values for the flying height of the heads 16A-16D can appropriately be determined. Accordingly, the flying height of the heads 16A-16D can be controlled by adjusting the heaters based on the control values.

Furthermore, in the first embodiment, the amount of the disturbances and the air pressure are calculated only based on asynchronous components in which synchronous components have been removed from the positioning error data as depicted in FIGS. 9A-9C. Thus, rotational synchronous errors of the magnetic disks are excluded from the calculation. Accordingly, the disturbances and the air pressure can be calculated with high accuracy.

Additionally, the HDD 100 in the first embodiment can appropriately adjust the flying height of the heads. Therefore, the clearances between the heads and the magnetic disks (the flying heights) are prevented from varying depending upon the air pressure. Accordingly, it is possible to prevent wear of the heads due to contact with the magnetic disks and production of dust (contaminations).

Furthermore, in the first embodiment, no air pressure sensor is required to be provided in the HDD 100. Thus, wear of the heads and production of dust can be prevented without causing increase of cost of the device.

Moreover, in the first embodiment, the clearance is increased in Step S32 only if the environment is under a reduced pressure, a read verification operation has been performed (Step S26 of FIG. 7), the verification has failed (Step S28), and the number of attempts has exceeded the maximum number of retrials (Step S30). Thus, the clearance is changed only if data writing errors have occurred. The clearance is not changed as long as the data write operation is correctly performed. Therefore, the number of operations for changing the clearance can be minimized.

Furthermore, the head is positioned to the same radial location (radial measurement location) when the reference disturbance estimate Db is to be measured in the experiment before the shipment and when the current disturbance estimate D is to be measured. Therefore, disturbance estimates can be calculated with high accuracy without being subject to influence of variations of positioning errors, which would be produced between an outer radius and an inner radius of the magnetic disk as depicted in FIGS. 11A and 11B.

In the first embodiment, a disturbance estimate is calculated based on the positioning error data. The air pressure is calculated based upon the disturbance estimate. The present invention is not limited to such an example. For example, a difference between the current positioning error data and positioning error data measured under a reference air pressure may be calculated and compared with a predetermined threshold. Then the comparison results may be used to determine whether or not the environment is under a reduced pressure. In this case, the current positioning error data have frequency components of 0 Hz to 1,200 Hz, preferably 0 Hz to 600 Hz, more preferably about 600 Hz. The positioning error data have frequency components of 0 Hz to 1,200 Hz, preferably 0 Hz to 600 Hz, more preferably about 600 Hz. Alternatively, a difference between the current disturbance estimate and a disturbance estimate calculated under a reference air pressure may be calculated and compared with a predetermined threshold. Then the comparison results may be used to determine whether or not the environment is under a reduced pressure. In either case, by using data having low-frequency components, a determination whether the environment is under a reduced pressure can be made more accurately as compared to conventional techniques.

In the above embodiment, the heaters 126A-126D are provided for the heads 16A-16D, respectively. The flying height of the head is adjusted based on the results of the read verification operation. However, the present invention is not limited to such an example. For example, in a case where no heaters are provided, only a read verification operation may be performed if it is determined that the environment is under a reduced pressure. In this case, a sequence of operations may be designed such that the process is abnormally terminated without adjusting the flying height if verification fails for a predetermined number of rewrite operations. With such a sequence of operations, the HDD 100 can be controlled so as to conform to the air pressure.

Second Embodiment

Next, a second embodiment of the present invention will be described with reference to FIGS. 18 to 21. The second embodiment differs from the first embodiment in a sequence of operations for writing and reading of the heads 16A-16D (particularly in operations relating to heater control). Therefore, the following description is focused on those differences, and parts or components that are the same as or equivalent to those in the first embodiment will be omitted or only briefly described in the following description.

Figure 18:
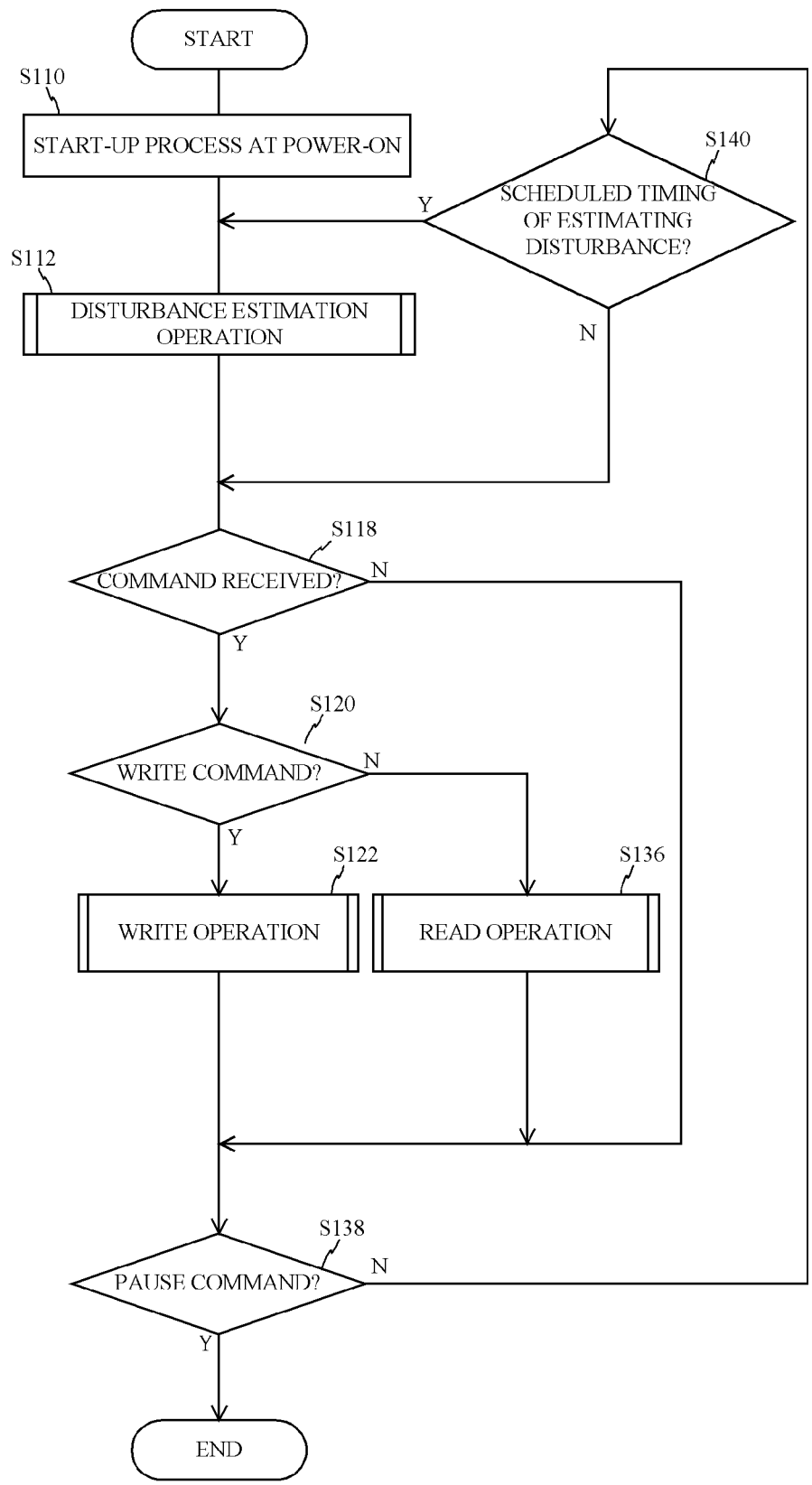
FIG. 18 is a flow chart showing an overall process of the HDD in a second embodiment of the present invention.

FIG. 18 shows a sequence of operations in the second embodiment. FIG. 18 corresponds to FIG. 7 of the first embodiment. A sequence of operations in the second embodiment will be described with reference to FIG. 18 and other drawings as needed. As depicted in FIG. 18, a start-up process (initialization process) is performed in respective portions of the HDD 100 in Step S110 when the HDD 100 is supplied with power. In Step S112, a disturbance estimation subroutine is executed.

Figure 19:
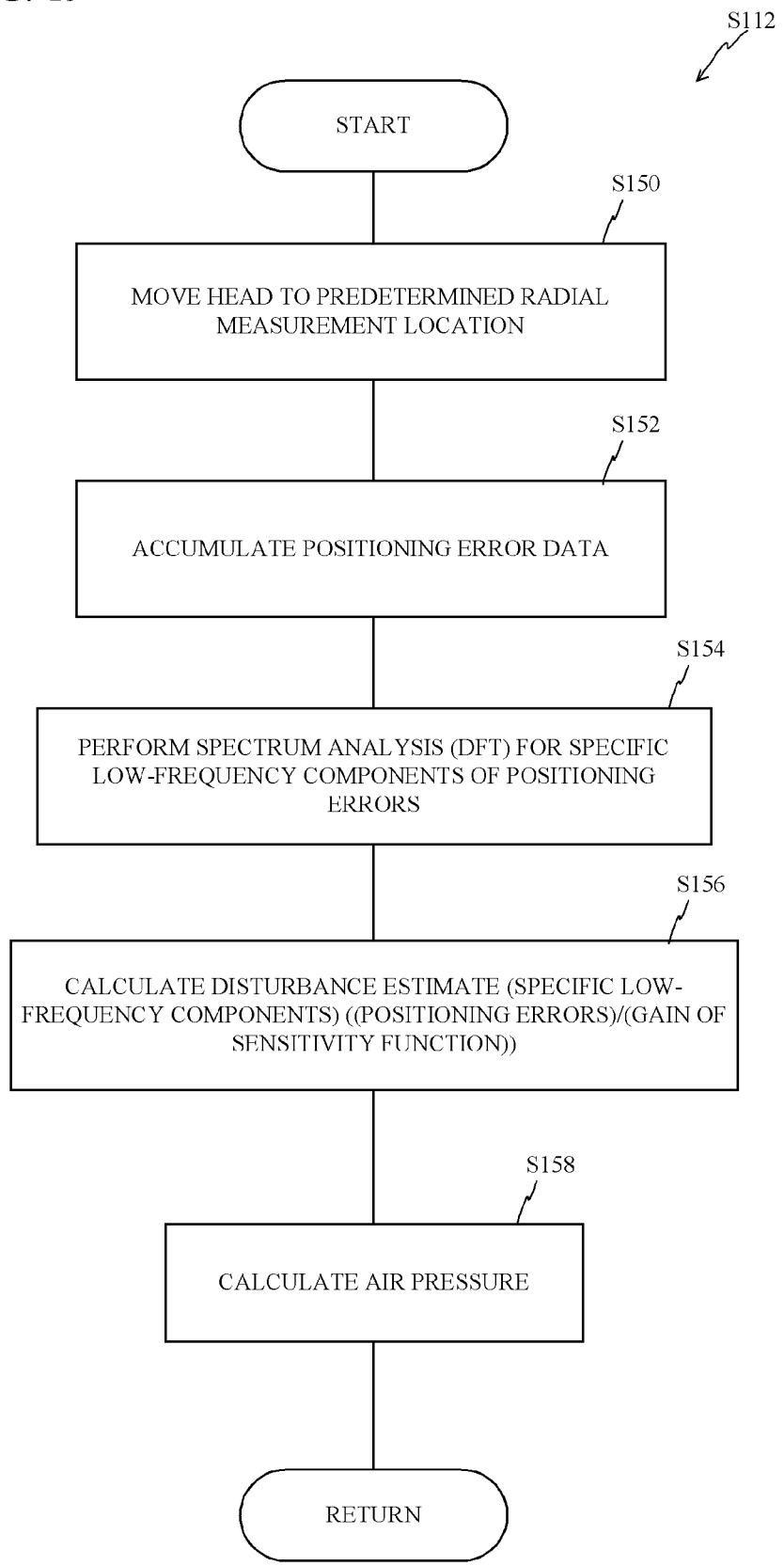
FIG. 19 is a flow chart showing a process of a subroutine S112 depicted in FIG. 18.

In the subroutine of Step S112, as depicted in FIG. 19, a sequence of Steps S150, S152, S154, S156, and S158 is performed in the order named as with FIG. 8 of the first embodiment. Thus, until Step S158 of FIG. 19 has been completed, a disturbance estimate is calculated by using low-frequency components of the positioning error data (for example, 0 Hz to 1,200 Hz, preferably 0 Hz to 600 Hz, more preferably about 600 Hz), and the current air pressure P is calculated from the disturbance estimate by using the aforementioned formula (4).

Next, in Step S118 of FIG. 18, the host interface controller 94 determines whether or not any command has been received from the host 82. If it is determined that no command has been received, then Step S138 proceeds. If it is determined that a command has been received, then the host interface controller 94 determines in the Step S120 whether or not the received command is a write command. If it is determined that the received command is a write command, then a write operation subroutine is executed (Step S122).

The write operation subroutine (Step S122) is performed as depicted in FIG. 20. In Step S160, the write operation unit 114A decodes the write command and specifies a head and a zone. The parameter management unit 106B obtains heater control values corresponding to the specified head and zone, which include a base control value B and an adjustment control value R to control the corresponding heater. In this case, the parameter management unit 106B retrieves necessary heater control values B (one of B1 to B4) and R (one of R1 to R4) from a table of heater control values (see FIG. 14), which is included in the parameter table 108 of the volatile memory 86.

Then, in Step S162, the heater control value management unit 116 of the parameter management unit 106B (the first register 120A depicted in FIG. 6) corrects the base control value so as to conform to the temperature and the air pressure. Thus, the second embodiment differs from the first embodiment in that the base control value is corrected in consideration of the air pressure as well as the temperature.

In this case, a correction value relating to the temperature (temperature correction value Jt) can be calculated by $$Jt = Kb \times (Tr - Ts) \tag{6}$$

where Tr is a current internal temperature of the device, Ts is a device temperature under conditions of a reference room temperature, and Kb is a temperature correction coefficient.

Furthermore, a correction value relating to the air pressure (air pressure correction value Jp) can be calculated by $$Jp = Kbp \times (Pr - Ps) \tag{7}$$

where Pr is a current air pressure, Ps is a reference air pressure, and Kbp is an air pressure correction coefficient.

Therefore, assuming that the base control value B1 is to be corrected, a corrected base control value B1" is obtained by $$B1'' = B1 + Jt + Jp \tag{8}$$

The other base control values B2-B4 can also be corrected in the same manner as described above. Those corrected base control values for the base control values B2-B4 are denoted by B2"-B4", respectively. In the following description, the base control value B" is used to collectively refer to the corrected base control values B1"-B4".

Next, in Step S164, the head selection circuit 124 of the head IC 52 starts a preheating control with the heater control value (B"+R) at a sector upstream from the specified sector. In other words, the head selection circuit 124 begins to supply power to the corresponding heater (126A-126D) based on the heater control value. Thereafter, in Step S1166, the head selection circuit 124 awaits until the head reaches the target sector. When the head reaches the target sector, then Step S168 proceeds. In Step S168, the head selection circuit 124 replaces the control value of the corresponding heater 126A-126D with the base control value B".

Subsequently, in Step S170, the write operation unit 114A writes data to the specified sector. When the write operation of the write data is thus completed (Step S172), the head selection circuit 124 switches the heater control off in Step S174. Thereafter, Step S138 of FIG. 18 proceeds.

If it is determined in Step S120 of FIG. 18 that the received command is not a write command but a read command, then a read operation subroutine is executed (Step S136).

In the subroutine of Step S136, basically the same operations as the subroutine S36 of the first embodiment (see FIG. 17) are performed. The subroutine of Step S136 differs from the subroutine S36 of the first embodiment in that correction in Step S182 is based on the aforementioned formula (8) and in that the heater control value used in Step S184 is (B"+R).

When all of the operations in the subroutine of Step S136 are completed, then Step S138 of FIG. 18 proceeds.

In Step S138, the host interface controller 94 determines whether or not the host has sent a pause command. If it is determined that the host has not sent a pause command, then Step S140 proceeds. In Step S140, it is determined whether or not a disturbance estimate is scheduled to be measured at the present timing. If it is determined that a disturbance estimate is not scheduled to be measured at the present timing, then Step S118 proceeds. Thereafter, the aforementioned operations are repeated.

Meanwhile, if it is determined in Step S140 that a disturbance estimate is scheduled to be measured at the present timing, then Step S112 proceeds so as to perform the aforementioned operations subsequent to the measurement of a disturbance estimate.

The operations and determinations depicted in FIG. 18 are repeated until it is determined in Step S138 that the host has sent a pause command. If it is determined in Step S138 that the host has sent a pause command, then all of the operations depicted in FIG. 18 are terminated.

As described in detail, the second embodiment achieves the same advantages as the first embodiment. Furthermore, correction of the heater control value based on the temperature and the air pressure allows the clearance to be controlled without a read verification operation. Thus, the speed of processing data can be enhanced by elimination a read verification operation.

In the first and second embodiments, the positioning error data are subtracted by synchronous components (RPE1-RPE200) to calculate asynchronous components (NRPE) of the positioning error data (see FIG. 9). A disturbance and an air pressure are calculated based on the asynchronous components. However, the present invention is not limited to such an example. For example, sharp peaks may be removed from the positioning error data as depicted in FIGS. 11A and 11B, and a disturbance and an air pressure may be calculated based on the corrected positioning error data. For example, if the rotational speed of the magnetic disks 12A and 12B is 5,400 rpm, then a disturbance and an air pressure are calculated after removal of frequency components of peaks which are produced at each interval of 90 Hz. Furthermore, if low-frequency components of positioning error data (0 Hz to 1,200 Hz, preferably 0 Hz to 600 Hz, more preferably about 600 Hz) are used in the first and second embodiment, then subtraction of synchronous components or removal of sharp peaks are not required. Even without subtraction of synchronous components or removal of sharp peaks, a disturbance and an air pressure can be calculated more accurately as compared to conventional techniques.

The aforementioned embodiments have been described as preferred embodiments of the present invention. The present invention is not limited to the illustrated embodiments and examples. It would be apparent to those skilled in the art that many modifications and variations may be made therein without departing from the spirit and scope of the present invention.

What is claimed is:

1. A method of controlling a flying height of a head operable to read data from and write data to a disk of a recording medium housed in an enclosure, the method comprising:
    positioning the head to a predetermined radial measurement location on the disk;
    obtaining error information on errors in the positioning of the head;
    performing a frequency analysis on the obtained error information;
    calculating disturbance information on errors caused by a wind disturbance from the frequency analysis result;
    calculating pressure information on an air pressure in the enclosure based on the calculated disturbance information;
    determining a control value for controlling a flying height of the head with respect to the disk based on the calculated pressure information; and
    controlling the flying height of the head based on the determined control value.

2. The method as recited in claim 1, wherein the calculating operation of the pressure information comprises excluding components that are in synchronism with rotation of the disk from the frequency analysis result.

3. The method as recited in claim 1, wherein the calculating operation of the pressure information comprises calculating the pressure information from the error information and a sensitivity function indicating servo characteristics of the head.

4. The method as recited in claim 1, wherein the calculating operation of the pressure information comprises extracting low-frequency components from the frequency analysis result to calculate the pressure information.

5. The method as recited in claim 4, wherein the calculating operation of the pressure information comprises extracting components having frequencies of 0 Hz to 1,200 Hz from the frequency analysis result to calculate the pressure information.

6. The method as recited in claim 4, wherein the calculating operation of the pressure information comprises extracting components having frequencies of 600 Hz to 1,200 Hz from the frequency analysis result to calculate the pressure information.

7. The method as recited in claim 4, wherein the calculating operation of the pressure information comprises extracting components having frequencies of 600 Hz from the frequency analysis result to calculate the pressure information.

8. A flying height control circuit for controlling a flying height of a head operable to read data from and write data to a disk of a recording medium housed in an enclosure, the flying height control circuit comprising:

a head operation controller operable to move the head to a predetermined radial measurement location on the disk;

a disturbance estimation unit operable to obtain error information on errors in the positioning of the head moved by the head operation controller, to perform a frequency analysis on the obtained error information, and to calculate disturbance information on errors caused by a wind disturbance from the frequency analysis result;

an air pressure calculation unit operable to calculate pressure information on an air pressure in the enclosure based on the disturbance information calculated by the disturbance estimation unit; and a control value management unit operable to determine a control value for controlling a flying height of the head with respect to the disk based on the pressure information calculated by the air pressure calculation unit.

9. The flying height control circuit as recited in claim 8, wherein the calculating operation of the pressure information comprises excluding components that are in synchronism with rotation of the disk from the frequency analysis result.

10. The flying height control circuit as recited in claim 8, wherein the calculating operation of the pressure information comprises calculating the pressure information from the error information and a sensitivity function indicating servo characteristics of the head.

11. The flying height control circuit as recited in claim 8, wherein the calculating operation of the pressure information comprises extracting low-frequency components from the frequency analysis result to calculate the pressure information.

12. The flying height control circuit as recited in claim 11, wherein the calculating operation of the pressure information comprises extracting components having frequencies of 0 Hz to 1,200 Hz from the frequency analysis result to calculate the pressure information.

13. The flying height control circuit as recited in claim 11, wherein the calculating operation of the pressure information comprises extracting components having frequencies of 600 Hz to 1,200 Hz from the frequency analysis result to calculate the pressure information.

14. The flying height control circuit as recited in claim 11, wherein the calculating operation of the pressure information comprises extracting components having frequencies of 600 Hz from the frequency analysis result to calculate the pressure information.

15. An information storage device comprising:

an enclosure accommodating a disk of a recording medium;

a head operable to read data from and write data to the disk;

a flying height control circuit for controlling a flying height of the head with respect to the disk, the flying height control circuit includes:
 (i) a head operation controller operable to move the head to a predetermined radial measurement location on the disk,
 (ii) a disturbance estimation unit operable to obtain error information on errors in the positioning of the head moved by the head operation controller, to perform a frequency analysis on the obtained error information; and to calculate disturbance information on errors caused by a wind disturbance from the frequency analysis result,
 (iii) an air pressure calculation unit operable to calculate pressure information on an air pressure in the enclosure based on the disturbance information calculated by the disturbance estimation unit, and
 (iv) a control value management unit operable to determine a control value for controlling a flying height of the head with respect to the disk based on the pressure information calculated by the air pressure calculation unit; and a flying height adjustment unit operable to adjust the flying height of the head with respect to the disk based on the control value determined by the control value management unit.

16. The information storage device as recited in claim 15, further comprising:

a verification determination unit operable to determine whether to verify data written to the disk based on the pressure information calculated by the air pressure calculation unit; and a verification operation unit operable to verify data written to the disk based on the determination of the verification determination unit.

17. The information storage device as recited in claim 16, wherein the flying height adjustment unit is operable to adjust the control value based on the verification result of the verification operation unit.

\* \* \* \* \*